United States Patent
Yang et al.

(10) Patent No.: US 10,477,609 B2
(45) Date of Patent: Nov. 12, 2019

(54) HEALING A RADIO MAP

(71) Applicant: Apple Inc., Cupertino, CA (US)

(72) Inventors: Chun-Yuan Yang, San Jose, CA (US); Darin Tay, Sunnyvale, CA (US); Wei Kong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,577

(22) Filed: Sep. 20, 2017

(65) Prior Publication Data
US 2018/0352585 A1 Dec. 6, 2018

Related U.S. Application Data

(60) Provisional application No. 62/514,238, filed on Jun. 2, 2017.

(51) Int. Cl.
| | |
|---|---|
| *H04W 76/19* | (2018.01) |
| *G01S 5/02* | (2010.01) |
| *H04W 4/04* | (2009.01) |
| *H04W 4/33* | (2018.01) |

(52) U.S. Cl.
CPC ............... *H04W 76/19* (2018.02); *G01S 5/02* (2013.01); *G01S 5/0252* (2013.01); *H04W 4/04* (2013.01); *H04W 4/33* (2018.02)

(58) Field of Classification Search
CPC .......................... H04W 64/00; G06Q 30/0261
See application file for complete search history.

(56) References Cited

U.S. PATENT DOCUMENTS

| | | | |
|---|---|---|---|
| 6,842,726 | B1 | 1/2005 | Scharosch et al. |
| 7,397,424 | B2 | 7/2008 | Houri |
| 7,856,234 | B2 | 12/2010 | Alizadeh-Shabdiz et al. |
| 7,899,583 | B2 | 3/2011 | Mendelson |
| 7,924,149 | B2 | 4/2011 | Mendelson |
| 8,054,219 | B2 | 11/2011 | Alizadeh-Shabdiz |
| 8,223,074 | B2 | 7/2012 | Alizadeh-Shabdiz |

(Continued)

FOREIGN PATENT DOCUMENTS

| | | |
|---|---|---|
| WO | WO 2011/077166 | 6/2011 |
| WO | WO 2013/110971 | 8/2013 |
| WO | WO 2016206717 | 12/2016 |

OTHER PUBLICATIONS

International Search Report and Written Opinion in International Application No. PCT/US2015/032736, dated Sep. 11, 2015, 13 pages.

*Primary Examiner* — Ernest G Tacsik
(74) *Attorney, Agent, or Firm* — Fish & Richardson P.C.

(57) ABSTRACT

A method comprising: receiving a harvest trace from a mobile device, the harvest trace including a plurality of location fixes each corresponding to a location at a venue, each location fix associated with data including one or more RSSI measurements of one or more wireless signals received from each of a plurality of wireless access points positioned at the venue, the plurality of location fixes including at least two location fixes that have a positional relationship with each other; comparing the data associated with one of the location fixes with data associated with a reference point identified in a radio map of the venue; and updating the radio map of the venue by updating the data associated with the reference point based on the data associated with the one of the location fixes.

25 Claims, 9 Drawing Sheets

(56) References Cited

U.S. PATENT DOCUMENTS

| | | |
|---|---|---|
| 8,340,691 B1 | 12/2012 | Starenky et al. |
| 8,369,264 B2 | 2/2013 | Brachet et al. |
| 8,478,297 B2 | 7/2013 | Morgan et al. |
| 8,694,366 B2 | 4/2014 | Barnes, Jr. |
| 8,775,065 B2 | 7/2014 | Gupta et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,148,764 B2 | 9/2015 | Das et al. |
| 9,198,003 B2 | 11/2015 | Marti et al. |
| 9,204,251 B1 | 12/2015 | Mendelson |
| 9,204,257 B1 | 12/2015 | Mendelson |
| 9,301,100 B1 * | 3/2016 | Jampani ................ G01S 5/0278 |
| 9,304,970 B2 | 4/2016 | Wirola et al. |
| 9,432,813 B2 | 8/2016 | Ahn et al. |
| 9,532,184 B2 | 12/2016 | Marti et al. |
| 9,584,981 B2 | 2/2017 | Noorshams et al. |
| 9,641,814 B2 | 5/2017 | Wirola et al. |
| 2007/0001904 A1 | 1/2007 | Mendelson et al. |
| 2008/0077326 A1 | 3/2008 | Funk et al. |
| 2010/0039929 A1 | 2/2010 | Cho et al. |
| 2011/0018732 A1 | 1/2011 | Cho et al. |
| 2011/0090081 A1 | 4/2011 | Khorashadi et al. |
| 2011/0231357 A1 | 9/2011 | Cho et al. |
| 2011/0241882 A1 | 10/2011 | Gonzales et al. |
| 2012/0015665 A1 | 1/2012 | Farley et al. |
| 2012/0029817 A1 | 2/2012 | Khorashadi et al. |
| 2012/0064855 A1 | 3/2012 | Mendelson |
| 2012/0072106 A1 | 3/2012 | Han et al. |
| 2012/0143495 A1 | 6/2012 | Dantu et al. |
| 2012/0191512 A1 | 7/2012 | Wuoti et al. |
| 2012/0203453 A1 | 8/2012 | Lundquist et al. |
| 2012/0245839 A1 | 9/2012 | Syed et al. |
| 2012/0274642 A1 | 11/2012 | Ofek et al. |
| 2013/0066550 A1 | 3/2013 | Takada et al. |
| 2013/0150076 A1 | 6/2013 | Kim et al. |
| 2013/0151139 A1 | 6/2013 | Park et al. |
| 2013/0179075 A1 | 7/2013 | Haverinen et al. |
| 2013/0281111 A1 | 10/2013 | Syrjarinne et al. |
| 2013/0336138 A1 | 12/2013 | Venkatraman et al. |
| 2014/0073345 A1 | 3/2014 | Chintalapudi |
| 2014/0107918 A1 | 4/2014 | Friedler et al. |
| 2014/0128100 A1 | 5/2014 | Sridhara et al. |
| 2014/0129136 A1 | 5/2014 | Celia |
| 2014/0148196 A1 | 5/2014 | Bassan-Eskenazi et al. |
| 2014/0162693 A1 | 6/2014 | Wachter et al. |
| 2014/0171098 A1 | 6/2014 | Marti et al. |
| 2014/0171114 A1 | 6/2014 | Marti |
| 2014/0213294 A1 | 7/2014 | Marti et al. |
| 2014/0213298 A1 | 7/2014 | Marti et al. |
| 2014/0235266 A1 * | 8/2014 | Edge .................... H04W 64/00 455/456.1 |
| 2014/0274136 A1 | 9/2014 | Edge et al. |
| 2014/0324590 A1 | 10/2014 | Kong et al. |
| 2014/0335893 A1 | 11/2014 | Ronen et al. |
| 2014/0335900 A1 | 11/2014 | Farris |
| 2014/0355592 A1 | 12/2014 | Camps et al. |
| 2014/0361927 A1 | 12/2014 | Jarvis et al. |
| 2015/0043362 A1 * | 2/2015 | Sankar .................... G01S 5/02 370/252 |
| 2015/0045054 A1 | 2/2015 | Emadzadeh et al. |
| 2015/0052460 A1 | 2/2015 | Mohammad Mirzaei et al. |
| 2015/0195682 A1 | 7/2015 | Lee et al. |
| 2015/0245180 A1 | 8/2015 | Lin et al. |
| 2015/0281910 A1 | 10/2015 | Choudhury et al. |
| 2015/0296342 A1 | 10/2015 | Boukallel et al. |
| 2015/0346317 A1 * | 12/2015 | Patel .................... G01S 5/0289 455/456.1 |
| 2016/0080911 A1 | 3/2016 | Kay et al. |
| 2016/0178726 A1 | 6/2016 | Wirola et al. |
| 2017/0134910 A1 | 5/2017 | Gu et al. |
| 2017/0295458 A1 * | 10/2017 | Gao ...................... H04W 4/02 |
| 2018/0035258 A1 * | 2/2018 | Pon ...................... H04W 4/027 |
| 2018/0275261 A1 * | 9/2018 | Khan .................... G01S 11/06 |

\* cited by examiner

HEALING A RADIO MAP

CROSS-REFERENCE TO RELATED APPLICATION

This application claims priority under 35 USC § 119(e) to U.S. Patent Application Ser. No. 62/514,238, filed on Jun. 2, 2017, the entire content of which are hereby incorporated by reference.

TECHNICAL FIELD

The disclosure generally relates to healing a radio map.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places where a mobile device does not have a line of sight with GPS satellites, GPS location determination can be error prone. For example, a conventional mobile device often fails to determine a location or determines a location with poor accuracy based on GPS signals when the device is inside a building or tunnel. For example, areas with obstructing buildings can diminish line of sight of the GPS signals and introduce error. In addition, even if a mobile device has lines of sight with multiple GPS satellites, error margin of GPS location can be in the order of tens of meters. Such error margin may be too large for determining on which floor of a building the mobile device is located, in which room of the floor the mobile device is located, on which side of a street the mobile device is located, on which block the mobile device is located, etc.

SUMMARY

In one aspect, in general, a method includes receiving a harvest trace from a mobile device. The harvest trace includes a plurality of location fixes that each corresponds to a location at a venue. Each location fix is associated with data including one or more RSSI measurements of one or more wireless signals received from each of a plurality of wireless access points positioned at the venue. The plurality of location fixes includes at least two location fixes that have a positional relationship with each other. The method also includes comparing the data associated with one of the location fixes with data associated with a reference point identified in a radio map of the venue. The method also includes updating the radio map of the venue by updating the data associated with the reference point based on the data associated with the one of the location fixes.

Implementations can include one or more of the following features.

In some implementations, the data associated with the reference point includes one or more RSSI measurements of one or more wireless signals received from each of a second plurality of wireless access points positioned at the venue.

In some implementations, the method also includes determining that one or more of the plurality of wireless access points included in the data associated with the one of the location fixes are absent from the second plurality of wireless access points included in the data associated with the reference point. The method also includes updating the data associated with the reference point to include the one or more RSSI measurements of the one or more wireless signals received from the one or more absent wireless access points.

In some implementations, the method also includes identifying one or more additional reference points that correspond to the reference point. The method also includes updating data associated with the one or more additional reference points to include the one or more RSSI measurements of the one or more wireless signals received from the one or more absent wireless access points. The one or more additional reference points that correspond to the reference point are located above or below the reference point on a different floor of the venue.

In some implementations, the method also includes determining that one or more of the second plurality of wireless access points included in the data associated with the reference point are absent from the plurality of wireless access points included in the data associated with the one of the location fixes. The method also includes updating the data associated with the reference point to remove the one or more RSSI measurements of the one or more wireless signals received from the one or more absent wireless access points.

In some implementations, the method also includes identifying one or more additional reference points that correspond to the reference point. The method also includes updating data associated with the one or more additional reference points to remove one or more RSSI measurements of one or more wireless signals received from the one or more absent wireless access point. The one or more additional reference points that correspond to the reference point are located above or below the reference point on a different floor of the venue.

In some implementations, the RSSI measurements for each of the plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

In some implementations, the method also includes, for each wireless access point included in both the data associated with the one of the location fixes and the data associated with the reference point, comparing the Rayleigh probability density function for the wireless access point associated with the one of the location fixes to the Rayleigh probability density function for the wireless access point associated with the reference point. The method also includes, based on the comparison, updating the data associated with the reference point for the wireless access point to include at least some of the one or more RSSI measurements of the one or more wireless signals received from the wireless access point.

In some implementations, the method also includes receiving a plurality of harvest traces from a plurality of mobile devices, filtering the plurality of harvest traces, and updating the data associated with the reference point based on the filtered plurality of harvest traces.

In some implementations, for each harvest trace, the RSSI measurements for each of the plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

In some implementations, filtering the plurality of harvest traces includes, for each harvest trace, for each wireless access point included in both the data associated with the one of the location fixes and the data associated with the reference point, comparing the Rayleigh probability density function for the wireless access point associated with the one of the location fixes to the Rayleigh probability density function for the wireless access point associated with the reference point. Filtering the plurality of harvest traces also includes, for each harvest trace, removing at least a portion of the harvest trace if a degree of similarity between the Rayleigh probability density function for the wireless access point associated with the one of the location fixes and the Rayleigh probability density function for the wireless access point associated with the reference point does not satisfy a threshold.

In some implementations, filtering the plurality of harvest traces includes determining, for each of the plurality of harvest traces, a speed of the mobile device, and for each of the plurality of harvest traces, removing at least a portion of the harvest trace if the speed of the mobile device satisfies a threshold.

In some implementations, the threshold is five meters per second.

In some implementations, filtering the plurality of harvest traces includes determining, for each of the plurality of harvest traces, a horizontal accuracy of each of the plurality of location fixes of the harvest trace, and for each of the plurality of harvest traces, removing at least portions of the harvest trace that correspond to location fixes that have a horizontal accuracy that satisfies a threshold.

In some implementations, the threshold is fifty meters.

In some implementations, the harvest trace represents a continuous motion path of the mobile device.

In some implementations, the harvest trace comprises a plurality of elements of harvest data, each element of harvest data corresponding to one of the location fixes.

In some implementations, each element of harvest data includes a plurality of sensor measurements.

In some implementations, the plurality of sensor measurements for each element of harvest data are used to determine a speed and a heading rate of the mobile device for the corresponding element of harvest data.

In some implementations, each of the location fixes is determined based at least in part on the speed and the heading rate for the corresponding element of harvest data.

In another aspect, in general, a system includes one or more processors, and at least one non-transitory device storing computing instructions operable to cause the one or more processors to perform operations including receiving a harvest trace from a mobile device. The harvest trace includes a plurality of location fixes each corresponding to a location at a venue. Each location fix is associated with data including one or more RSSI measurements of one or more wireless signals received from each of a plurality of wireless access points positioned at the venue. The plurality of location fixes includes at least two location fixes that have a positional relationship with each other. The operations also include comparing the data associated with one of the location fixes with data associated with a reference point identified in a radio map of the venue. The operations also include updating the radio map of the venue by updating the data associated with the reference point based on the data associated with the one of the location fixes.

In another aspect, in general, at least one non-transitory storage device stores computer instructions operable to cause one or more processors to perform operations including receiving a harvest trace from a mobile device. The harvest trace includes a plurality of location fixes each corresponding to a location at a venue. Each location fix is associated with data including one or more RSSI measurements of one or more wireless signals received from each of a plurality of wireless access points positioned at the venue. The plurality of location fixes includes at least two location fixes that have a positional relationship with each other. The operations also include comparing the data associated with one of the location fixes with data associated with a reference point identified in a radio map of the venue. The operations also include updating the radio map of the venue by updating the data associated with the reference point based on the data associated with the one of the location fixes.

Particular implementations may provide one or more of the following advantages.

In some implementations, using a trace to update (e.g., self-heal) the radio map (e.g., as opposed to using a single element of harvest data including a single location fix) can provide a number of advantages. For example, a harvest trace can be used to determine a speed at which a mobile device is traveling. In some implementations, the harvest trace can represent a trajectory of the mobile device (and, e.g., the user) as the mobile device and the user travel along a particular path. The continuous nature of the trace can also provide other useful information. For example, the continuous trace can be observed to ascertain the validity of the data (e.g., the confidence in the location fixes). For example, a continuous trace that passes through walls of the venue of the radio map can be discounted as including errors. The continuous trace has many opportunities to be anchored to a true location of the mobile device (e.g., a location that can be determined with a high degree of accuracy), thereby re-initiating the trace to prevent compounded errors.

In some implementations, the harvest trace includes a plurality of location fixes that are interrelated. The plurality of location fixes may each correspond to a location at a venue such that each of the location fixes has a positional relationship with at least one other location fix. For example, a first location fix may correspond to a beginning of a trace (e.g., a starting point of a trajectory of the mobile device), a second location fix may correspond to a second location on the trace that represents a change in location of the mobile device relative to the starting point, etc. In this way, the trace can represent a continuous motion path of the mobile device at a plurality of locations throughout the venue.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
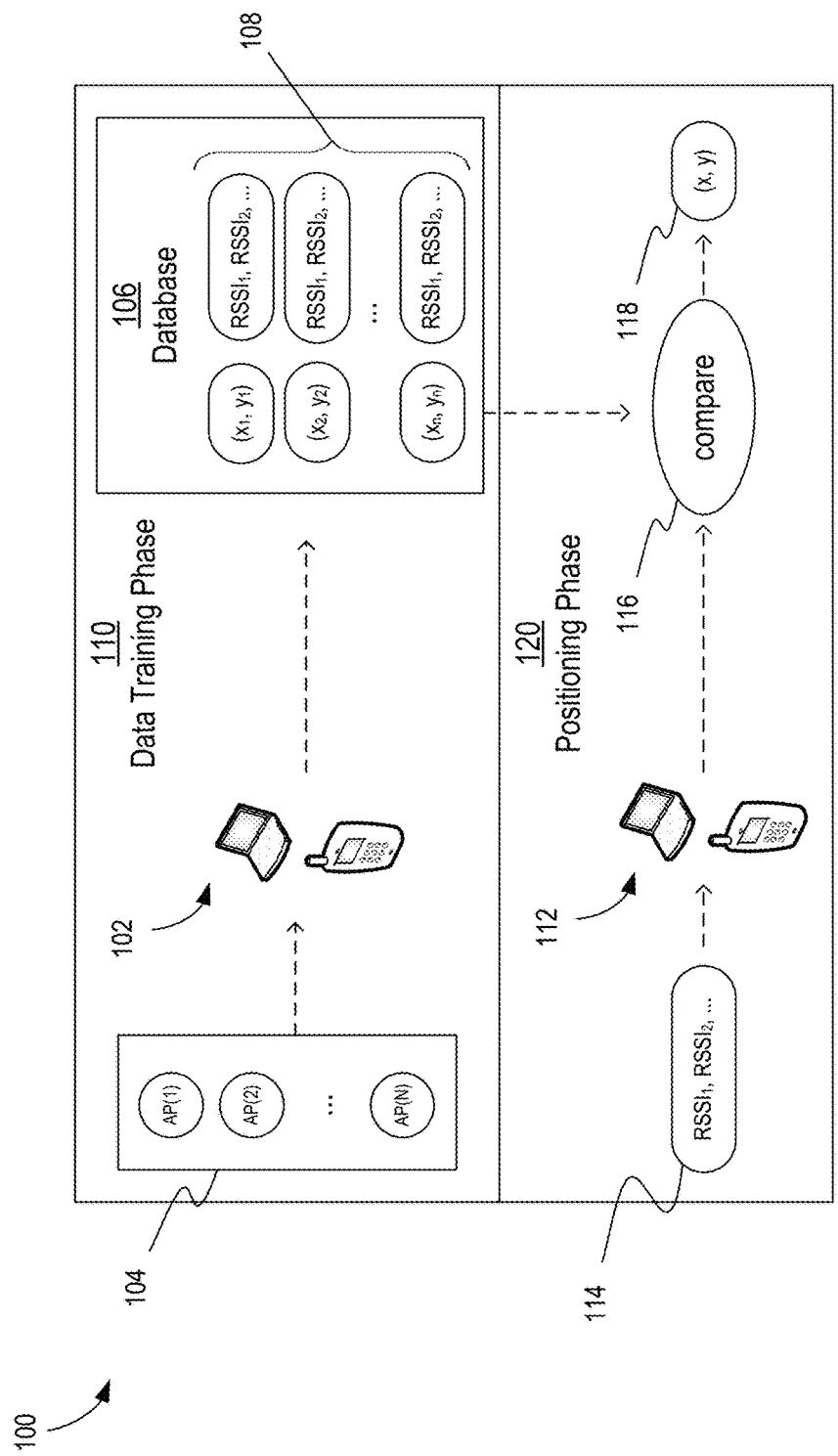
FIG. 1 is a block diagram illustrating an indoor positioning system.

Referring to FIG. 1, an indoor positioning system 100 can use wireless local-area network (WLAN) (e.g., Wi-Fi) infrastructure to allow a mobile device 112 to determine its position in an indoor venue, where other techniques such as GPS may not be able to provide accurate and/or precise position information.

In general, source data related to the venue is received. The source data can include information associated with various locations of the venue. For example, the source data may be a radio map that characterizes a location fingerprint of the venue (e.g., a collection of RSSI measurements from various access points (APs) used to determine a location of a device in the venue. In some implementations, the source data may be survey data (e.g., RSSI measurements obtained by a survey device when the survey device is positioned throughout the venue) that is used to build the radio map.

In some implementations, a Wi-Fi-based positioning systems involves at least two phases—a data training phase 110 and a positioning phase 120. During the data training phase 110 (e.g., sometimes referred to as the surveying phase), a mobile survey device 102 (e.g., a mobile computing device such as a mobile phone, laptop, PDA, etc.) is positioned at various reference points throughout the venue (e.g., reference points $(x_1, y_1)$, $(x_2, y_2)$, etc.). Each reference point may be associated with latitude/longitude coordinates. In some implementations, the reference points are predetermined locations within the venue for which positioning information is desired. The predetermined locations (e.g., for which the data training phase 110 is performed) can later be identified as a current location of the mobile device 112 when a subsequent positioning phase 120 is performed on the mobile device 112. In some implementations, the actual locations of the reference points may not be predetermined, but may instead be determined according to one or more rules and/or criteria. For example, a first reference point may be defined at a particular location of the venue (e.g., at an entrance of the venue), and additional reference points may be defined at a particular distance interval (e.g., every 10 meters) in one or more particular directions, as described in more detail below.

An operator of the survey device 102 (e.g., a surveyor) may travel to a first reference point within the venue and provide an input on a user interface of the survey device 102 to indicate the position of the first reference point relative to the venue. For example, the surveyor may travel to a first reference point $(x_1, y_1)$ and drop a pin on an indoor map representation of the venue. In some implementations, a grid may be presented over the map representation of the venue. The grid can be made up of cells having the same or similar dimensions. The cells may be three meters by three meters, ten meters by ten meters, etc. Each of the reference points may correspond to one of the cells. The map representation of the venue may be obtained from a venue map database. The venue map may include representations of multiple floors of the venue, including outer boundaries of the venue, indoor obstructions (e.g., walls), etc.

The surveyor may then cause the survey device 102 to gather a plurality of measurements (e.g., Wi-Fi measurements). In particular, the survey device 102 determines all access points (APs) (e.g., wireless APs) 104 that the survey device 102 is in communication with and measures a characteristic of the received signals, such as the received signal strength indicators (RSSIs) of each of the signals received from each of the APs 104. RSSIs are measurements of a degree of power present in a received radio signal. For each reference point, a plurality (e.g., hundreds) of RSSI measurements are obtained for each AP 104. Each AP 104 may be associated with an identifier such as a media access control (MAC) address that the survey device 102 can use to identify the particular AP 104. Measurements may be obtained at a set interval (e.g., every few seconds). Measurements may be obtained over multiple days and under different conditions, such as under different climate conditions, different venue conditions (e.g., when the venue is highly populated, slightly populated, and unpopulated), different times of day, and/or different physical venue conditions (e.g., different combinations of doors and/or windows within the venue being open or closed, etc.). The surveyor may then travel to a second reference point $(x_2, y_2)$ and repeat the procedure, and so on until a comprehensive number of reference points within the venue have been gathered. The full set of measurements for all APs 104 at all reference points within the venue are stored as entries 108 in a database 106 (e.g., a fingerprint database). The collection of measurements is sometimes referred to as the location fingerprint of the venue.

In some implementations, the location data may be obtained using one or more techniques other than the data training phase 110 described above. For example, other source data may be obtained and used to provide the location fingerprint of the venue. In general, the location fingerprint is based on source data that is deemed to be high quality and accurate data (e.g., data that correlates RSSI measurements to corresponding positions to a relatively high degree of accuracy). Other types of source data that can be used to create the location fingerprint (and, e.g., the radio map) are described in more detail below.

The positioning phase 120 occurs after the training phase has at least partially been completed. During the positioning phase, the mobile device 112 (e.g., a mobile device separate from the survey device 102) at a particular location within the venue may attempt to determine its location. The mobile device 112 performs a scan of all APs 104 in communication range of the mobile device 112 and obtains RSSI measurements 114 for signals received from each AP 104. The RSSI measurements 114 are compared 116 to the various measurements included in the location fingerprint stored in the database 106 and a location 118 of the mobile device 112 is determined. For example, the RSSI measurements 114 obtained by the mobile device 112 may be similar to the RSSI measurements that were obtained by the survey device 102 at a particular reference point, and as such, the mobile device 112 may determine that it is located at the particular reference point (e.g., located within the same cell as the particular reference point). The mobile device 112 may identify the location that corresponds to particular reference point (e.g., the location that was dropped as a pin on the map by the surveyor) and provide that particular location as the current location 118 of the mobile device 112. Additional details about the matching process are described below. Such matching techniques typically employ a "probabilistic approach" in which the mobile device 112 determines the reference point at which there exists the highest probability that the mobile device is located, although other techniques may also be used. The location fingerprint (e.g., the plurality of data included in the various survey data entries 108) can be used to create RSSI probability distributions of each APs 104 at reference points.

The location fingerprint obtained by the survey device can generally be referred to as survey data. Indoor positioning systems typically provide an accurate estimation of the location of the mobile device within the venue provided the mobile device is located near a reference point.

Over time, one or more characteristics of the venue may change. For example, one or more of the APs positioned throughout the venue may be moved to different locations; one or more of the APs may be removed (e.g., decommissioned because of obsolescence or malfunction); one or more APs that were not commissioned at the time of the data training phase may be added to the venue; physical characteristics of structures of the venue (e.g., walls, fixtures, etc.) may be changed/added/removed, which may cause the new location fingerprint of the venue (e.g., after structural changes have been made) to not match the location fingerprint obtained during the data training phase 110 due to multipath environment changes. Therefore, the indoor positioning system 100 described above may be relatively accurate soon after the data training phase has occurred, but may diminish in accuracy as changes to the characteristics of the venue occur. In other words, the positioning phase may determine the positions of mobile devices to a relatively higher degree of accuracy when the characteristics of the venue have remained relatively more constant, and errors in the positioning phase may exist to a relatively higher degree as more changes to the characteristics of the venue occur.

Figure 2:
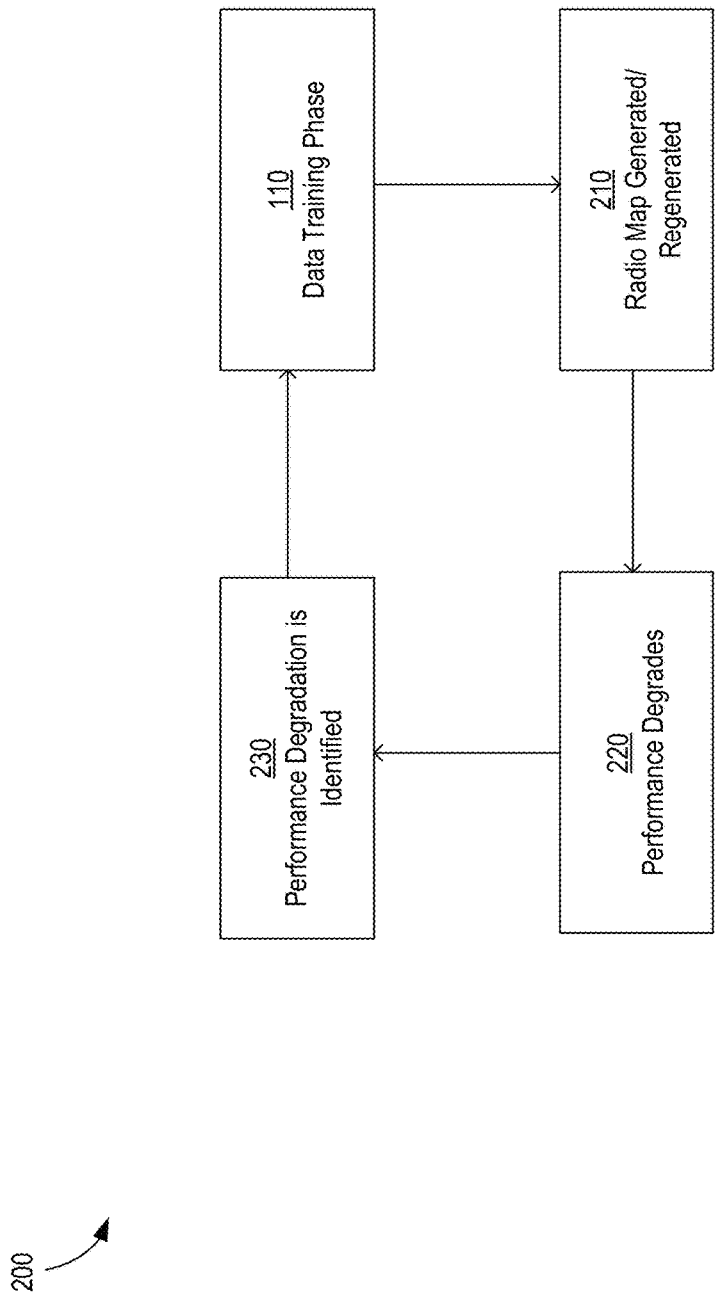
FIG. 2 shows a flowchart illustrating a process for updating a radio map by repeating a data training phase.

One way to correct such errors is to repeat the data training phase. FIG. 2 shows a flowchart 200 of an exemplary process for updating the radio map by repeating the data training phase. Once the initial data training phase 110 is performed, the radio map is generated 210, as described above. Over time, the performance of the indoor positioning system degrades 220. In particular, the accuracy of the positioning phase 120 (e.g., the locations of the mobile device 112 identified in the positioning phase 120 do not represent the true location of the mobile device 112). The performance degradation is identified 230, and the data training phase 110 is repeated. Following each iteration of the data training phase 110, the radio map may be regenerated 210 (e.g., updated) using the data obtained from the most recent iteration of the data training phase 110. For example, the new data obtained during subsequent data training phases 110 can be used to updated/modify the data in the database 106, and the radio map may be updated according to the updated database 106.

Repeating the data training phase 110 may be time consuming because it typically must be performed by physically locating to the various reference points and obtaining measurements. Further, the data training phase 110 typically requires a human user, and as such, it can become costly to repeat the data training phase 110. Therefore, repeating the data training phase 110 can be increasingly cumbersome, especially when performed at relatively shorter intervals.

In some implementations, other location data can be used by the indoor positioning system 100 to identify possible errors that are identified in the positioning phase 120 and correct for such errors. For example, harvest data (e.g., data obtained by enlisting a relatively large number of people via an online medium) that are obtained in and/or around the venue may be considered for addition to the database 106, or may be used to update/delete existing entries 108 in the database 106.

Figure 3:
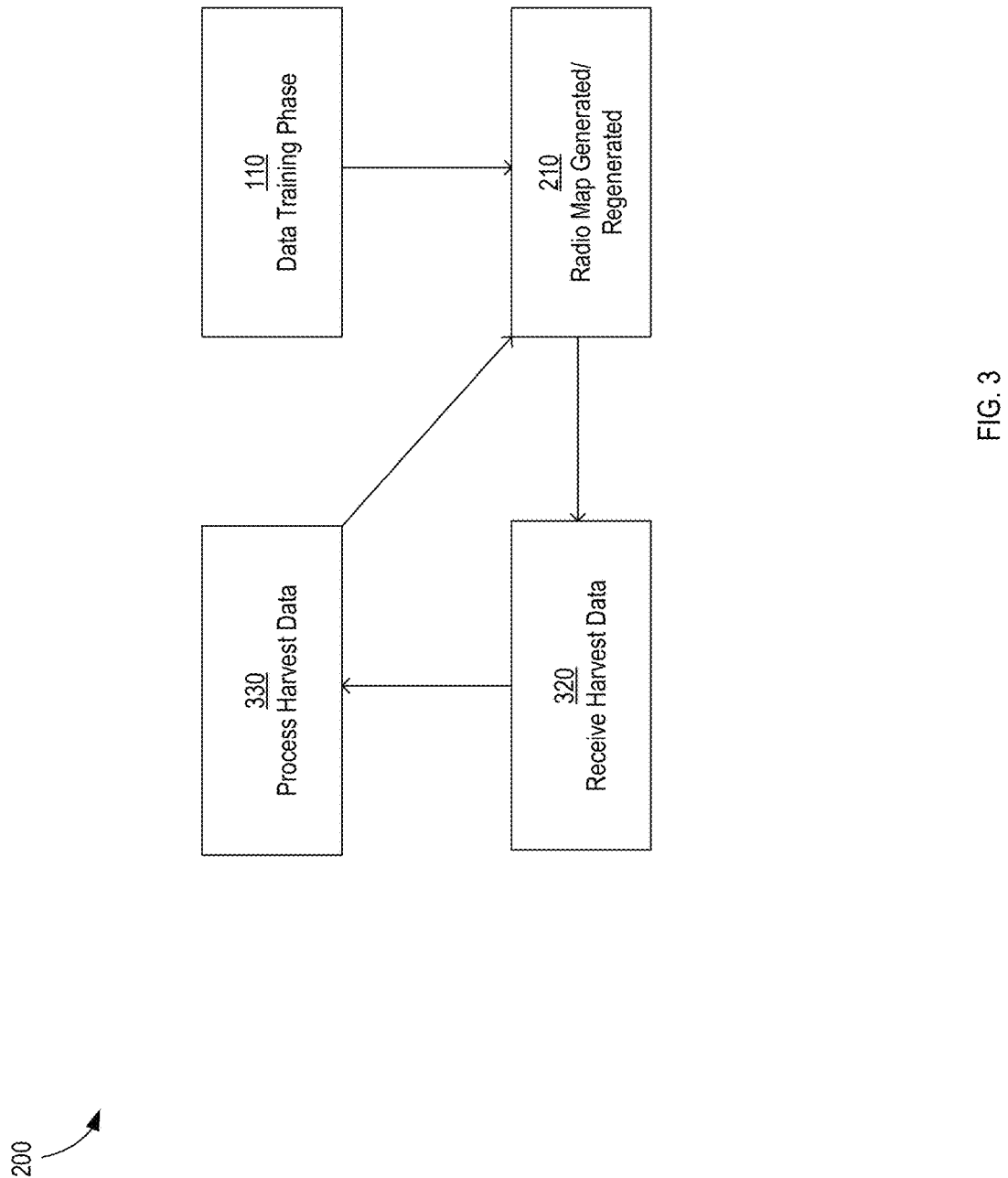
FIG. 3 shows a flowchart illustrating an exemplary process for self-healing the radio map using harvest data.

FIG. 3 shows a flowchart of an exemplary process for self-healing the radio map using harvest data. Once the initial data training phase 110 is performed, the radio map is generated 210, as described above. After the initial data training phase 110, the radio map self-heals. In particular, harvest data is received 320 from a plurality of devices operating in the environment of the venue, the harvest data is processed 330, and the processed harvest data is used to regenerate 210 the radio map. Such a process is sometimes referred to as "self-healing" the radio map because data that would otherwise become inaccurate over time is augmented with data that accounts for changes to the venue represented by the radio map. In this way, performance degradation of the indoor positioning system 100 that would otherwise occur (e.g., without such self-healing) can be substantially slowed and/or eliminated.

In some implementations, the radio map may be regenerated 210 once a performance degradation of the radio map has been identified. For example, users of mobile devices 112 performing the positioning phase 120 may provide an indication that the determined location of the mobile device 112 does not represent the true position of the mobile device 112 (e.g., by submitting a report through an application, such as a mapping application). In some implementations, the radio map may be regenerated 210 when a threshold number of indications are received. In some implementations, the radio map may be regenerated 210 according to a predetermined interval (e.g., once a week, once a month, etc.).

In some implementations, the harvest data are data that are obtained by various mobile devices 112 during the positioning phase 120. In some implementations, the harvest data can include harvest traces. A collection of data used to determine one or both of a position and a motion of a device (e.g., over a period of time) is sometimes referred to as "trace" data, or generally as a "trace". Therefore, a collection of motion and/or position data obtained by enlisting a relatively large number of people may be referred to as harvest trace data, or generally, a harvest trace. Each element of harvest data can be a sample point including sensor measurements obtained by the mobile device 112, with the collection of sample points making up a harvest trace.

In general, harvest data is obtained by enlisting a relatively large number of people via an online medium. For example, users who run a particular operating system and/or application on their mobile device 112 may contribute harvest data to an operator of the operating system and/or application. The harvest data can be provided to services that can use the harvest data for various purposes. For example, a plurality of users may agree to contribute harvest data while running a mapping application on their mobile device 112. In some implementations, the user may be required to "opt-in" before harvest data can be contributed (e.g., to protect the privacy of the user). An operator of a different service or application, such as an operator of an indoor positioning system, may receive the harvest data from an operator of the mapping application and use the harvest data to improve the indoor positioning system, as described herein.

Figure 4:
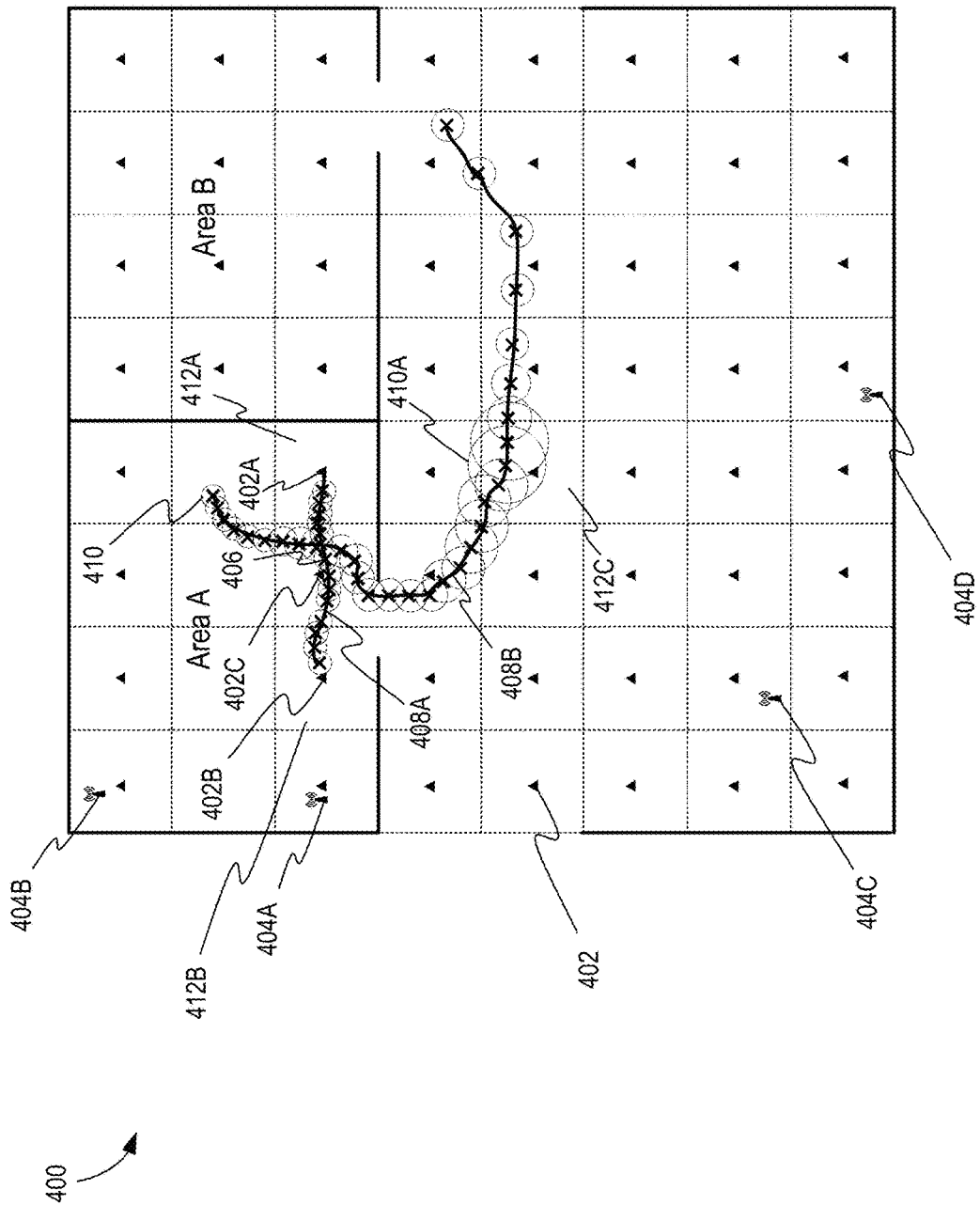
FIG. 4 shows an example of a radio map for a venue.

As described above, the venue and areas in proximity to the venue may be expressed as a graphical map, sometimes referred to as a radio map. The radio map is associated with the survey data obtained during the data training phase 110, as well as other location data (e.g., harvest data). The term radio map originates from the association of the graphical map with such location data that is based on characteristics of radio signals (e.g., Wi-Fi signals). FIG. 4 shows an example of a radio map 400 for a venue (e.g., an indoor shopping mall). The indoor positioning system 100 described above with respect to FIG. 1 may be employed in the mall.

During the data training phase 110, a surveyor may bring a survey device (e.g., the survey device 102 of FIG. 1) to each of a plurality of reference points 402, represented as black triangles in the illustration. In some implementations, a grid may be overlaid over the map of the mall. The grid can be made up of cells. In some implementations, some or all of the cells are square cells having the same or similar dimensions (e.g., between three meters by three meters and ten meters by ten meters, although smaller or larger dimensions can also be used). In some implementations, the grid may be made up of cells of various shapes and sizes.

The cells have the effect of binning data obtained by the survey device 102. The cells can also be used as a visual aid for the surveyor to indicate locations for which survey data is to be obtained. For example, the survey device 102 may include a user interface that is configured to display the radio map 400 (or, e.g., a modified version of the radio map 400) with the overlaid grid. Once the surveyor is positioned at a particular reference point 402A within a corresponding cell 412A in Area A, he or she may provide an input through the user interface (e.g., a touch input) to indicate the location of the reference point 402A to be tested. For example, the surveyor may drag and drop a pin into the corresponding cell 412A on to the radio map 400 to indicate the particular reference point 402A at which the survey device 102 is currently positioned.

A plurality of APs 404 (e.g., such as the APs 104 of FIG. 1) may be distributed throughout the mall. The APs 404 may be positioned in hallways/corridors of the mall, in the stores, outside of the mall, etc. Once the survey device 102 is positioned at the particular reference point 402 to be tested, the survey device 102 may obtain a plurality of measurements from the various APs 404. For example, the survey device 102 may be positioned at the particular reference point 402A and perform a scan to determine which APs 404 the survey device 102 is in wireless communication with. In this example, the survey device 102 may be in wireless communication with two APs 404A, 404B. The other APs 404C, 404D (and, e.g., others that may not be shown in FIG. 4) positioned throughout the venue may be obstructed (e.g., by walls of the venue) such that the transmitted signals do not have a sufficient RSSI to be detected by the survey device 102 when the survey device 102 is at the particular reference point 402A. The survey device 102 receives one or more signals from the two APs 404A, 404B, records an identifier for the two APs 404A, 404B (e.g., such as a MAC address), and measures an RSSI of the signals. The data can be stored in a database (e.g., the database 106 of FIG. 1), the surveyor can bring the survey device 102 to another reference point 402, and the process can be repeated until data for each desired reference point 402 is obtained. In this way, an initial version of the radio map 400 is built.

Consider an example in which a mobile device (e.g., the mobile device 112 of FIG. 1) is positioned within the cell 412A of the radio map 400 that corresponds to the particular reference point 402A during a subsequent positioning phase 120. The mobile device 112 may receive RSSI measurements from the two APs 404A, 404B that are substantially similar to the RSSI measurements obtained by the survey device 102 during the data training phase 110 and stored in the database 106. As such, the mobile device 112 may correctly determine that the mobile device 112 is positioned within the cell 412A that corresponds to the particular reference point 402A.

Consider another example in which one or more characteristics of Area A change between a time at which the data training phase 110 was performed and a time at which the subsequent positioning phase 120 is performed. For example, consider an example in which one or more structures are added to the cells that neighbor the AP 404A. During the subsequent positioning phase 120, the measurements obtained by the mobile device 112 that correspond to the signals transmitted by the AP 404B may remain substantially unchanged (e.g., relatively to the measurements obtained during the data training phase 110), but the measurements obtained by the mobile device 112 that correspond to the signals transmitted by the AP 404A may be significantly different (e.g., relative to the measurements obtained during the data training phase 110). Such differences may result in the mobile device 112 being unable to determine its location, or may result in the mobile device 112 incorrectly determining its location. In order to account for such differences in the characteristics of the venue, one or more entries 108 of the location fingerprint can be updated, modified, and/or deleted, thereby allowing the radio map 400 to update (e.g., so that mobile devices 112 that perform subsequent positioning phases 120 may have updated data usable to accurately determine their locations using fresher data). Such a process is sometimes referred to as "self-healing" of the radio map 400. Harvest data can be used to identify changes in the venue and update the location fingerprint, thereby allowing subsequent positioning phases 120 to determine locations of mobile devices 112 with continued high accuracy.

In general, self-healing of the radio map 400 is performed by identifying a "true" location of the mobile device 112 (e.g., a location of the mobile device 112 that is determined with a relatively high degree of accuracy), identifying which of the APs 404 the mobile device 112 is in communication with, measuring the RSSI of signals received from those APs 404, comparing the identified APs 404 and the RSSI measurements to the location fingerprint stored in the database 106, and updating the database 106 accordingly. The "true" location of the mobile device 112 may not necessary represent the exact location of the mobile device 112, yet the "true" location may be taken as true because there exists a high degree of confidence in the identified location. For example, a mobile device 112 that performs the positioning phase 120 and is unable to identify a satisfactory match with the location fingerprint obtained during the data training phase 110 may not be able to provide a true location; a mobile device 112 that performs the positioning phase 120 and is able to identify a match with the location fingerprint with a high degree of confidence may deem the determined location to be a true location; a mobile device 112 that uses high quality harvest data to determine its location may deem the determined location as a true location. The true location of the mobile device 112 is sometimes referred to as an anchor point herein because the true location can have the effect of reinitializing the location of the mobile device 112 for subsequent extrapolation using harvest data.

In the example illustrated in FIG. 4, during the positioning phase 120, the mobile device 112 may receive RSSI measurements from the two APs 404A, 404B that substantially match the RSSI measurements obtained during the data training phase 110. As such, the mobile device 112 may correctly determine that the mobile device 112 is positioned at the cell 412A that corresponds to the particular reference point 402A. A relatively high degree of similarity between the RSSI measurements obtained during the data training phase 110 and the RSSI measurements obtained during the positioning phase 120 may allow the mobile device 112 to deem the determined location a true location of the mobile device 112. In some implementations, the determined location may be associated with a degree of truth. The measurements obtained by the mobile device 112 during the positioning phase 120 may be provided to a server (e.g., a "cloud" server).

A user of the mobile device 112 may travel to a new location within Area A. For example, the user may travel to a cell 412B, and the mobile device 112 may again perform the positioning phase 120. However, this time, the RSSI measurements obtained by the mobile device 112 may be significantly different from the location fingerprint stored in the database 106 such that the mobile device 112 cannot determine its location to an acceptable degree of accuracy. There are a number of reasons as to why the current RSSI measurements may be different from the RSSI measurements obtained by the survey device 102 during the data training phase 110. Consider an example in which significant obstructions existed between the cell 412B of Area A and the APs 404C, 404D during the surveying phase 110. Such obstructions may have resulted in the survey device 102 not receiving any signals (or, e.g., receiving weak wireless signals) from the APs 404C, 404D. The lack of such signals results in the APs 404C, 404D being absent from the entries 108 in the database 106 that correspond to a reference point 402B of the cell 412B. However, since the data training phase 110, the obstruction may have been removed, resulting in the mobile device 112 now receiving signals from the APs 404C, 404D. As such, the collective RSSI measurements obtained by the mobile device 112 may not match the RSSI measurements obtained during the data training phase 110, and the mobile device 112 may be unable to determine its location as being the reference point 402B (or, e.g., the mobile device 112 may determine its location incorrectly). Therefore, using the positioning phase 120, the mobile device 112 is unable to determine a true location.

The RSSI measurements obtained during the positioning phase 120 may be used to update the entry 108 in the database 106 that corresponds to the reference point 402 of the cell 412B. The RSSI measurements are taken in the existing structure of the venue (e.g., different from the structure of the venue when the data training phase 110 was performed), and as such, the signals from which the RSSI measurements are obtained travel in the updated multipath environment. However, as mentioned above, the mobile device 112 cannot accurately determine its location due to the structural changes of the venue. In order for the RSSI measurements to be of use in updating the database 106, the location of the mobile device 112 must be determined to a reasonable degree of accuracy in some other way. In other words, the true location (or, e.g., a determined location that satisfies a confidence threshold) of the mobile device 112 must be determined.

In some implementations, harvest data 406 may be used to determine the location of the mobile device 112. Recall that the mobile device 112 determined its location to a reasonable degree of certainty when the mobile device 112 was positioned at the reference point 402A. The harvest data 406 can be used to determine a new, true location of the mobile device 112 relative to a previously determined true location. In other words, the determined location of the mobile device 112 at the reference point 402A can be used as an anchor point, and the harvest data 406 can be used to estimate the new true location of the mobile device 112 relative to the anchor point.

The harvest data 406 are represented as black x's in the illustration of FIG. 4. Each element of harvest data 406 may be associated with a degree of uncertainty, such as a horizontal accuracy 410 represented by a circle surrounding the element of harvest data 406. In general, the horizontal accuracy 410 represents the area surrounding a location fix within which the actual location of the mobile device 112 may reside. Each element of harvest data 406 may be a sample point including, among other things, one or more sensor measurements (e.g., from one or more of a pedometer, an accelerometer, a gyroscope, a magnetometer, a compass, a barometer, etc.) obtained by the mobile device 112. The harvest data 406 may up a trace (e.g., a harvest trace), such as a trace 408A. The trace 408A is a collection of elements of harvest data 406. The trace 408A represents a trajectory as the device travels along a particular path, for example, from the cell 412A to the cell 412B. Each element of harvest data 406 is associated with a location fix (e.g., a determined location of the mobile device 112 at a time when the element of harvest data 406 was collected), and the various elements of harvest data 406 make up the trace 408A, such that the trace 408A is a continuous collection of location fixes that represents a continuous motion path traveled by the mobile device 112. In some examples, the trace 408A can be determined at least in part by employing a regression technique (e.g., a least squares technique using a Kalman filter) on the harvest data 406. The trace 408A is also determined in part by the mobile device 112 performing the positioning phase 120 when the various elements of harvest data 406 are obtained. A plurality of locations of the mobile device 112 that reside on the trace 408A over time can be determined.

In some implementations, each element of harvest data 406 includes: i) data used to identify the location of the mobile device 112, and ii) RSSI measurements for one or more of the APs 404. The data used to identify the location of the mobile device 112 (e.g., sometimes generally referred to as sensor data, motion data, dead reckoning data, etc.) includes measurements obtained by sensors of the mobile device 112. The elements of harvest data 406 may be obtained at a frequency of approximately 1 Hz (e.g., one element of harvest data 406 per second), and may include a speed and a heading rate. In some implementations, one or both of the speed and the heading rate (or, e.g., the sensor measurements used to determine the speed and heading rate) may be downsampled (e.g., at a frequency of less than 1 Hz). Such downsampling may be performed to reduce the resolution of the data in order to protect the privacy of the user.

The speed may be determined based on measurements obtained by a pedometer, accelerometer, and/or gyroscope. For example, a step count may be obtained by the pedometer, and a stride length (e.g., a distance traveled per step) may be determined based on measurements obtained by the accelerometer and/or the gyroscope. Based on the step count and the stride length, a distance traveled by the mobile device 112 can be indirectly determined. Thus, using the step count and the stride length over an elapsed time, the speed of the mobile device 112 can be determined. The heading rate may be determined based on measurements obtained by a compass, the gyroscope, the accelerometer, a magnetometer, etc. In particular, the heading rate may be derived based on a change of attitude of the mobile device 112 as measured by one or more of the compass, the gyroscope, the accelerometer, the magnetometer, etc. The heading rate can be integrated by the mobile device 112 to determine a heading. Therefore, for each element of harvest data 406, a value for the speed and a value for the heading of the mobile device 112 is determined, and a location fix is determined for each element of harvest data 406. The location fix for each element of harvest data 406 is represented by the position of the elements of harvest data 406 on the radio map 400.

Each element of harvest data 406 also includes RSSI measurements for one or more of the APs 404. Therefore, once the trace 408A is determined based on the harvest data 406, and one or more location fixes on the trace 408A are determined, such location fixes can be correlated to particular cells of the radio map 400 and to the reference point 402 that resides within those cells.

In this example, the mobile device 112 determines that some elements of harvest data 406 have location fixes that correspond to locations within the cell 412B, and thus the RSSI measurement obtained by the mobile device 112 that corresponds to the harvest data 406 within the cell 412B correspond to the reference point 402B. The entry 108 in the database 106 that corresponds to the reference point 402B can be updated to include RSSI measurements obtained from the APs 404C, 404D. In this way, APs 404C, 404D can be added to the location fingerprint for the cell 412B. Such additional data can be considered by other mobile devices 112 during subsequent positioning phases 120 to improve the accuracy of the location determination.

In some implementations, rather than an obstruction being removed between a time at which the data training phase 110 was performed and a time at which the positioning phase 120 was performed, an obstruction may be added. Under such scenarios, the mobile device 112 may not detect signals from APs 304 that were previously identified during the data training phase 110. In a similar manner as that described above with respect to the removed obstruction, the entry 108 in the database 106 that corresponds to the reference point 402B may be updated to remove the RSSI measurements that correspond to the APs 404 that are no longer detected.

As mentioned above, the location fingerprint data may be updated (e.g., by modifying entries 108, adding new entries 108, deleting entries 108, etc.) due to APs 404 being added, APs 404 being removed, structural features of the venue being altered, and/or APs 404 moving location, as well as for other reasons. Scenarios dealing with the addition and removal of APs 404 have been specifically described above, and typically require the addition of new entries 108 to the database 106 and the removal of existing entries 108 from the database 106, respectively. Adding new entries 108 to the database 106 provides the location fingerprint with fresher data sources, while removing existing entries 108 rids the location fingerprint of redundant information that would otherwise have a negative impact on the accuracy of the positioning phase 120.

In some implementations, rather than one or more of the APs 404 being present in the measurements obtained during the data training phase 110 but absent from the measurements obtained during the positioning phase 120, or one or more of the APs 404 being absent from the measurements obtained during the data training phase 110 but presenting in the measurements obtained during the positioning phase 120, the RSSI measurements for a particular AP 404 may simply be different (e.g., have a different RSSI probability distribution) between the occurrence of the data training phase 110 and the positioning phase 120. For example, structural features of the venue may change, thereby changing the multipath environment and affecting the RSSI measurements of signals received from an AP 404. In some implementations, an AP 404 that was identified during the data training phase 110 may move locations between the data training phase 110 and the positioning phase 120. The change in location may not be significant enough that the measurements obtained during the positioning phase 120 entirely omit the particular AP 404, but the change may result in the RSSI probability distribution (e.g., the location fingerprint that corresponds to the particular AP 404) being different between the two phases 110, 120.

In some implementations, the harvest data 406 may be filtered before it is used to update the existing location fingerprint data that is stored in the database 106. The harvest data 406 may include a relatively large number of traces 408 (e.g., in the order of thousands, tens of thousands, hundreds of thousands, etc.). With such a large number of traces 408 available, it may be desirable to include traces 408 identified as being of the highest quality and omitting traces 408 identified as being of lesser quality.

In some implementations, the harvest data 406 may include one or more indicators of the accuracy of the data. For example, the harvest data 406 may include a parameter for indicating that the measurements obtained by one or more of the pedometer, the gyroscope, the accelerometer, the magnetometer, etc. are particularly noisy or particularly inaccurate for a variety of reasons. Such inaccuracies may result in an inaccurate calculation of the user's speed and heading rate, and in turn, inaccurate location fixes on the trace 408. Thus, if the parameter satisfies a predetermined threshold, the trace 408 (or, e.g., a portion of the trace) may be filtered out (e.g., ignored for purposes of self-healing).

Each element of harvest data 406 may be associated with a horizontal accuracy 410. In the illustrated example, the horizontal accuracy 410 for each element of harvest data 406 is represented by a circle surrounding the element of harvest data 406. A diameter of the circle corresponds to the degree of horizontal accuracy 410. For example, each element of harvest data 406 that resides on the trace 408A has a relatively small degree of horizontal accuracy 410, represented by the relatively small diameters of each circle. In general, the horizontal accuracy 410 represents the area surrounding the location fix within which the actual location of the mobile device 112 may reside. Consider an example in which the location fix for an element of harvest data 406 resides at coordinates (0, 0) in meters and has a horizontal accuracy 410 of two meters. The actual location of the mobile device 112 that corresponds to that element of harvest data 406 may be anywhere within two meters of location (0, 0). A horizontal accuracy 410 of two meters may generally signify that the location fix is of satisfactory accuracy.

In some implementations, the magnitude of the horizontal accuracy 410 may be based at least in part on a degree of similarity between the RSSI measurements obtained by the mobile device 112 during the positioning phase and the data obtained during the data training phase 110. For example, if the mobile device 112 is able to determine its location by identifying a matching reference point 402, the determined location may have a confidence parameter that is based on a degree of similarity between the RSSI measurements and an entry 108 in the database 106 that corresponds to the matching reference point 402. The value for the confidence parameter may correspond to the horizontal accuracy 410, with relatively higher values for the confidence parameter corresponding to relatively smaller horizontal accuracies 410 (e.g., smaller circles).

In some implementations, the magnitude of the horizontal accuracy 410 may be based at least in part on one or more parameters for indicating a degree of noise and/or a degree of inaccuracy in the measurements obtained by one or more of the pedometer, the gyroscope, the accelerometer, the magnetometer, etc. of the mobile device 112. For example, if the sensor data for an element of harvest data 406 is identified as being relatively inaccurate, then the determined speed and heading rate may also be inaccurate. In turn, the location fix corresponding to the element of harvest data 406 may be inaccurate, which can result in an increased horizontal error for the element of harvest data 406.

In some implementations, location fixes that have a horizontal accuracy that surpasses a threshold may be omitted from being considered for self-healing purposes. For example, FIG. 4 shows an example of another trace 408B that includes various elements of harvest data 406 each having a horizontal accuracy 410. The elements of harvest data 406 that reside within Area A have an acceptable horizontal accuracy 410. However, as the trace 408B approaches an area below and between Area A and Area B, the elements of harvest data 406 begin showing a large horizontal accuracy 410. For example, some of the elements of harvest data 406 within a cell 412C have horizontal accuracies 410A that indicate that the location fix might have a degree of error that may result in the true location of the mobile device 112 being in a cell other than the cell 412C.

In some implementations, portions of the trace 408B that include harvest data 406 having an unacceptable degree of horizontal accuracy 410A may be filtered out (e.g., omitted from the data used to update the database 106 and self-heal the radio map 400). While the trace 408B is shown as traveling through the cell 412C, the degree of horizontal accuracy 410A indicates that the true path of the mobile device 112 may have traveled through a neighboring cell. If the harvest data 406 were used to update the location fingerprint that corresponds to the cell 412C, but the RSSI measurement were actually received while the mobile device 112 was in the cell above the cell 412C, the self-healing would have a negative effect on the radio map 400. In particular, in subsequent positioning phases 120, mobile device 112 that travel through the cell above the cell 412C may incorrectly determine their locations as being in the cell 412C.

In some implementations, a threshold may be established that defines an acceptable degree of horizontal accuracy 410. In some implementations, the threshold may be 10 meters, although any appropriate value may be chosen based on a variety of factors, including characteristics of the venue, the degree of accuracy desired for the indoor positioning system, etc. In some implementations, a threshold of approximately 50 meters may be appropriate, such that harvest data 406 with horizontal accuracy above 50 meter is filtered out.

In some implementations, not only are elements of harvest data 406 having a horizontal accuracy 410 that surpasses the threshold filtered out, but elements of harvest data 406 that reside on the trace 408 following the harvest data 406 of unacceptable accuracy are also filtered out. In other words, once a portion of a trace 408 is identified as having a horizontal accuracy 410 that is unacceptable, the remainder of the trace 408 may be truncated. In some implementations, despite a portion of a trace 408 being identified as having a horizontal accuracy 410 that is unacceptable, other portions the trace 408 may nonetheless be salvaged (e.g., considered for self-healing purposes) if other location fixes on the trace can be determined to a relatively high degree of accuracy. In other words, other portions of the trace 408 may have a location fix that is determined as being the true location of the mobile device 112. Or, for example, the positioning 120 phase may be performed on the mobile device 112 and provide a determined location with a relatively high degree of confidence. In this way, the trace 408 may be anchored to the determined location, the trace 408 may continue into other areas of the radio map 400, and subsequent harvest data 406 and location fixes may be considered provided the harvest data 406 is determined to be of acceptable accuracy.

In some implementations, portions of the trace 408 may also be filtered if the harvest data 406 indicates that a speculated moving speed indicated by the trace 408 does not fit typical human walking speeds. As described above, the harvest data 406 includes measurements obtained by sensors of the mobile device 112, and the measurements are used to infer a walking speed of the user. The measurements are used to determine a step count a stride length over an elapsed time, and the speed of the user can be determined to assist in generating the trace 408. In some implementations, the measurements may have the appearance of representing steps of the user, but they may have instead been obtained based on other actions. For example, a mobile device 112 in a pocket of a user while the user rides a bike or travels in a car may take measurements that are erroneously determined to represent steps of the user. Such measurements may result in inaccurate location fixes on the trace 408.

One way to remove such portions of the trace 408 from being included in the self-healing is to set a speed threshold for the trace 408. Referring to the trace 408B, the harvest data 406 that reside in the cells below Area B are relatively further spaced apart than the elements of harvest data 406 that reside with Area A, indicating that the speed of the mobile device 112 at these positions was relatively high. The exact speed value for the mobile device 112 can be determined based on the particular measurements included in the harvest data 406. In some implementations, portions of the trace 408B that indicate a speed of greater than 1 m/s (e.g., the typical walking speed) may be filtered. In some implementations, a higher threshold may be used such that harvest data 406 obtained while users are jogging may also be considered. However, in some implementations, it may be desirable to limit the harvest data 406 to only that which is obtained at a walking speed, as location fixes may tend to include higher degrees of error as speed increases.

In some implementations, portions of the trace 408 that are determined to likely reside outdoors or outside of a boundary of the radio map 400 may be filtered out. In some examples, each element of harvest data 406 (e.g., each corresponding to a location fix) may include a parameter that indicates a probability that the location fix resides outdoors and/or outside of a boundary of the radio map 400. Portions of the trace 408 that correspond to location fixes for which the probability parameter is surpassed may be filtered out. Such portions of the trace 408 may be unhelpful in updating the radio map 400 because they correspond to locations that the radio map 400 does not cover.

In some implementations, an estimator may be used to determine the probability parameter that indicates the probability that the location fix of each element of harvest data 406 resides outdoors (e.g., outside the venue). The estimator can compare the RSSI measurements corresponding to the harvest data 406 obtained by the mobile device 112 to the RSSI measurements that correspond to the reference point that corresponds to the location fix. Running the estimator on the harvest data 406 can reduce or prevent situations in which a location fix that is actually outdoors (e.g., but perhaps close to the venue) is incorrectly determined to be indoors (e.g., inside the venue and within the radio map 400).

In the examples described above, we have generally referred to a single trace 408 that resides within a particular cell of the radio map 400. However, in practice, a relatively large number of traces 408 may be included in the data that is provided to the server and considered for self-healing the radio map 400. In practice, hundreds, thousands, etc. traces may reside within a particular cell. Even after performing the filtering steps described above (e.g., to filter portions of traces 408 that have a horizontal accuracy 410 that surpasses a threshold, to filter portions of traces 408 that do not correspond to an expected walking speed, to filter portions of traces 408 that likely reside outdoors and/or outside of a boundary of the radio map 400, etc.), the harvest data 406 within a particular cell may be further filtered for other reasons.

When the data training phase 110 is performed by the survey device 102, a single device is used to obtain all RSSI measurements. However, the harvest data 406 is obtained from various mobile devices 112. The various mobile devices 112 may have different characteristics. For example, antenna of the mobile devices 112 may have different specifications and/or gains, thereby resulting in different operating characteristics. In general, the various traces 408 that pass through a particular cell are processed to determine the most appropriate data for self-healing the radio map 400. The other data may be filtered such that they are not implemented in self-healing purposes.

Figure 5:
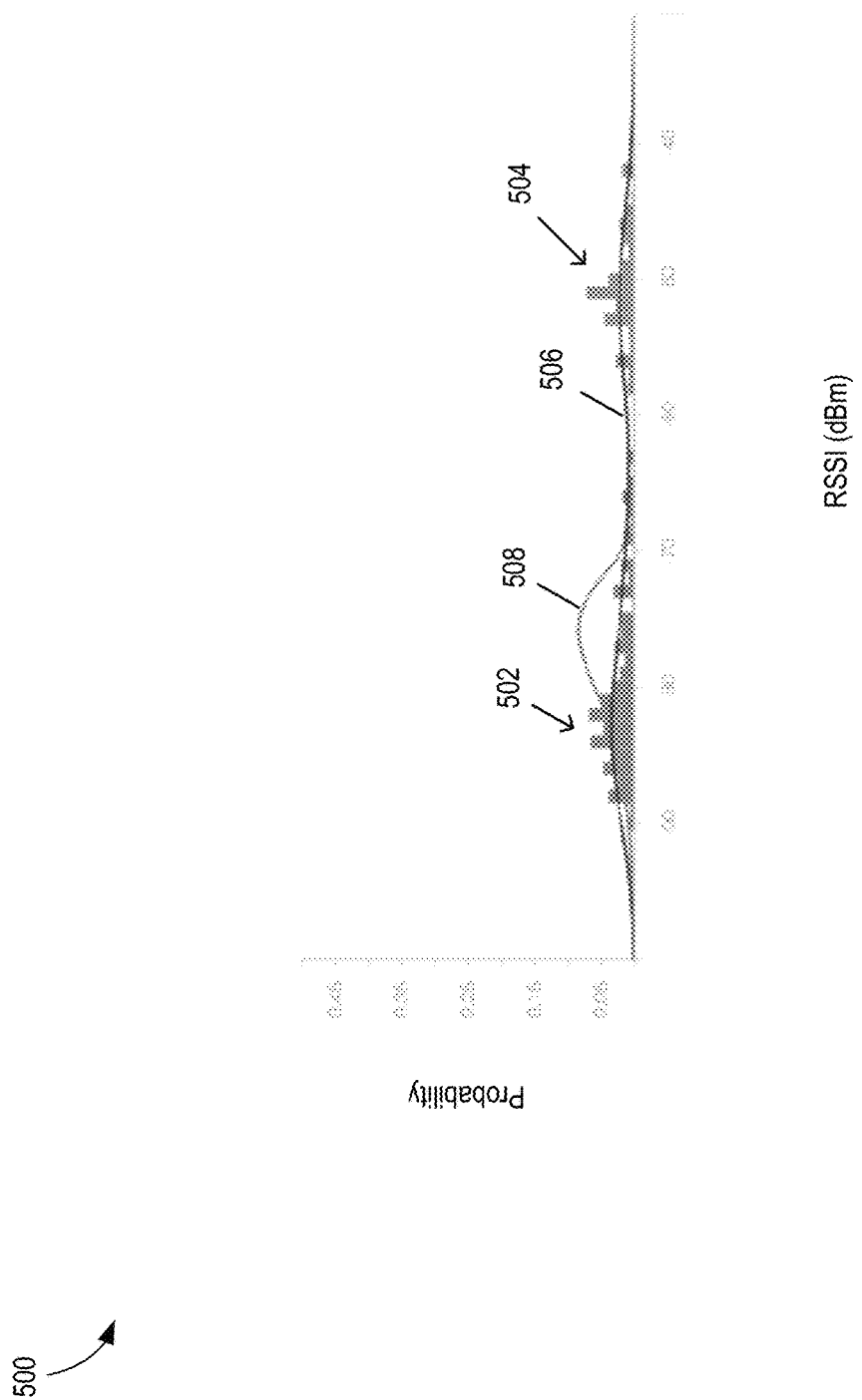
FIG. 5 shows an example of a graph that illustrates a best fit Rayleigh distribution for harvest data having a multimodal distribution.

FIG. 5 shows an example of a graph 500 that corresponds to a particular AP 404 at a particular reference point 402 (e.g., a reference point 402C). The graph 500 includes RSSI measurements from a first trace 502 (e.g., from the trace 408A), RSSI measurements from a second trace 504 (e.g., from the trace 408B), and a probability density estimation 506 applied to the set of RSSI measurements 502, 504. In practice, the graph 500 may include RSSI measurements from a variety of other traces 408 obtained from a variety of other mobile devices 112. The graph 500 illustrates the multi-modal distribution nature of RSSI measurements from various harvest data.

In some implementations, as an initial step, an dBm offset may be applied to the RSSI measurements of the various traces 408. For example, the mobile device 112 used to obtain the RSSI measurements of the first trace 502 may have an antenna with a smaller gain that an antenna of the mobile device 112 used to obtain the RSSI measurements of the second trace 504. The gain offset can be determined and applied to the RSSI measurements of the second trace 504 such that the data is equivalent. In the illustrated example, a dBm offset has already been applied to the RSSI measurements of the second trace 504, yet there still exist significant differences between the two traces 502, 504.

Once the dBm offset is applied (e.g., if required), the probability density estimation 506 is applied to the RSSI measurements 502, 504. In this example the probability density estimation 506 is a kernel density estimation (KDE). The KDE separates the RSSI measurements corresponding to each of the traces 502, 504 into separate groups. In this example, the RSSI measurements are separated into two groups. In practice, two, three, or four groups are typically identified by the probability density estimation 506. The groups identified by the probability density estimation 506 are fit to a probability density distribution (e.g., a Rayleigh distribution), the Rayleigh distributions are cross-checked with Rayleigh distributions of neighboring cells, and a best fit is determined. In this example, a best fit Rayleigh distribution 508 is identified as corresponding to the first trace 502 (e.g., corresponding to the trace 408A of FIG. 4). Therefore, when self-healing the cell of the radio map 400 that includes the reference point 402C, the harvest data 406 from the trace 408B are filtered out.

In this example, two traces 408A, 408B pass through the cell that includes the reference point 402C, and the data from one of those traces 408A, 408B is filtered out. In practice, a large number of traces (e.g., hundreds, thousands, etc.) may pass through the cell. Even with such a large number of traces, the data can typically be grouped into two, three, or four groups by the probability density estimation. In the same manner as described above, the groups identified by the probability density estimation 506 are fit to a probability density distribution (e.g., a Rayleigh distribution), the Rayleigh distributions are cross-checked with Rayleigh distributions of neighboring cells, a best fit is determined, and the data included in the other groups are filtered out.

Figure 6:
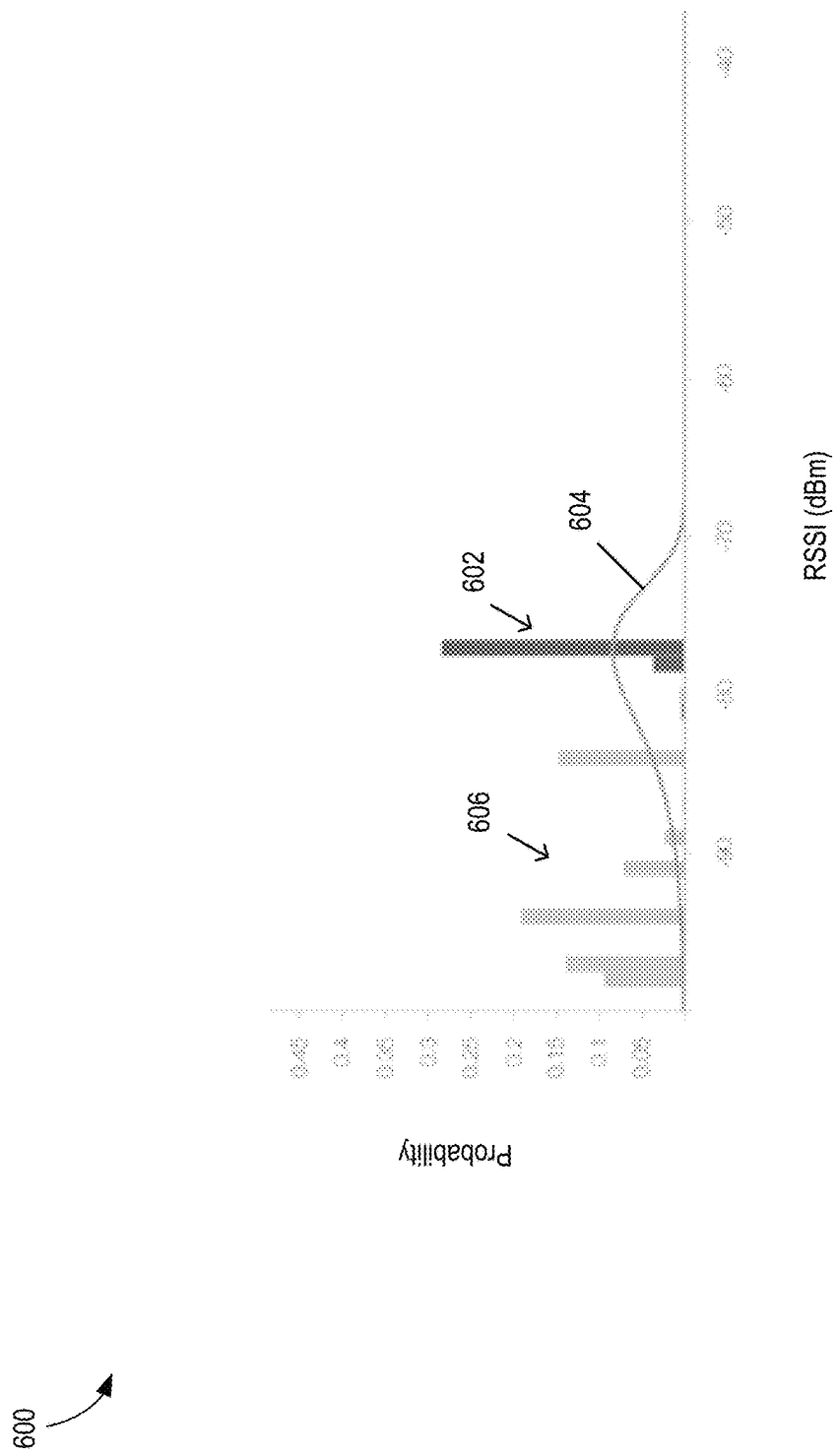
FIG. 6 shows an example of a graph that illustrates filtering of RSSI measurements included in harvest data.

In some implementations, when a change is identified in the RSSI probability distribution for a particular AP 404 at a particular reference point 402, the particular AP 404 may be removed from the entry 108 that corresponds to the particular reference point 402. FIG. 6 shows an example of a graph 600 that corresponds to a particular AP 404 at a particular reference point 402. The graph 600 includes RSSI measurements 602 obtained during the data training phase 110, an RSSI probability distribution 604 created based on the RSSI measurements 602 obtained during the data training phase 110, and RSSI measurements 606 included in harvest data 406 obtained during a subsequent positioning phase 120.

As described above, after the data training phase 110, the RSSI probability distribution 604 is created for each AP 404 at each reference point 402 for which RSSI measurements were obtained. In particular, the RSSI measurements 602 are fit to a particular probability distribution having a particular probability density function, such as a Rayleigh distribution, as illustrated. RSSI measurements 606 included in the harvest data 406 obtained during subsequent positioning phases 120 may also be fit to a Rayleigh distribution. If the RSSI probability distribution for the harvest data 406 is sufficiently different than the RSSI probability distribution 604 created based on the RSSI measurements 602 obtained during the data training phase 110, the AP 404 may be removed from the entry 108 in the database 106 that corresponds to the particular reference point 402. In the illustrated example, the RSSI measurements 606 included in the harvest data 406 have a significantly different distribution, and as such, the AP 404 is removed from the entry 108.

In some implementations, the RSSI probability distribution for the harvest data 406 is compared to the RSSI probability distribution 604 created based on the RSSI measurements 602 obtained during the data training phase 110 and a consistency score is calculated. If the consistency score does not satisfy a threshold, a determination may be made that the distributions are sufficiently different such that the AP 404 should be removed from the corresponding entry 108. In some implementations, rather than removing the AP 404 from the corresponding entry 108, the AP 404 may be maintained and updated with the RSSI measurements 606 included in the harvest data 406.

In some implementations, the venue may include a plurality of floors, and the various APs 404 may be positioned throughout the plurality of floors. An AP 404 positioned on a particular floor of the venue may be observable from other floors of the venue. When harvest data 406 is used to add/remove an AP 404 to/from the database 106 for a particular reference point 402 (e.g., which is located on a particular floor of the venue), information related to the AP 404 for corresponding reference points 402 on the other floors of the venue is also considered.

Consider an example in which an AP 404 that is located on a third floor of a three-floor venue is observable from all three floors. The AP 404 is located at a reference point 402 on the third floor. A corresponding reference point exists on the second floor (e.g., underneath the reference point 402 on the third floor), and a corresponding reference point exists on the first floor (e.g., underneath the reference point on the second floor). A mobile device 112 may obtain RSSI measurements that match the reference point 402 on the second/third floor when the mobile device 112 is located near the reference point 402 on the second/third floor, respectively. However, the mobile device 112 may not obtain RSSI measurements that match the reference point on the first floor when the mobile device 112 is located near the reference point on the first floor. Based on these observations, the AP 404 may be removed from the entry 108 that corresponds to the reference point 402 on the first floor. However, removing the AP 404 may result in subsequent positioning phases 120 performed when the mobile device 112 is positioned on the first floor and which do detect the AP 404 being prevented from correctly determining the location of the mobile device 112 as being on the first floor. In other words, there may be a tendency for mobile device 112 positioned on the first floor to be identified as being located on other floors. This is generally referred to as floor selection bias. To prevent such floor selection bias, information related to the AP 404 at the corresponding reference points 402 on the other floors of the venue is also considered before a determination is made as to whether the AP 404 should be removed from an entry 108. In other words, corresponding reference points 402 on other floors are cross-referenced as part of the process of deciding whether the AP 404 should be removed from an entry 108 corresponding to a particular floor.

In some implementations, to prevent or minimize floor selection bias, when a determination is made to remove an AP 404 from an entry 108 that corresponds to a reference point 402 on a particular floor, that AP 404 is removed from corresponding reference points 402 on all floors. A determination of whether to remove the AP 404 from all floors may be a second (e.g., separate) determination from the original determination to remove the AP 404 from the particular floor. In this way, a conservative approach can be applied in which a potentially-problematic change (e.g., removing the AP 404 from a single floor) is avoided by removing the AP 404 from all floors and avoiding possible floor selection bias. Further, because such a large amount of harvest data 406 may be available, other harvest data 406 that may not present such problems can instead be considered for modifying the database 106.

Floor selection bias can also occur when adding an AP 404 to an entry 108 that corresponds to a reference point 402 on a particular floor. Consider an example in which a decision is made to add an AP 404 to a second floor of a three floor venue, yet the AP 404 may be absent from corresponding reference points 402 on the first and third floor of the venue. However, the AP 404 may yet be observable from the second and third floors. If the AP 404 is observed in subsequent positioning phases 120 when a mobile device 112 is positioned on the first or third floor, the location of the mobile device 112 may nonetheless be determined to be on the second floor. As such, techniques similar to those described above with the respect to removing APs 404 may also be employed when adding APs 404 in order to avoid or reduce floor selection bias. In particular, corresponding reference points 402 on the first and third floors can be cross-referenced as part of the process of deciding whether the AP 404 should be added to an entry 108 corresponding to the second floor. In some implementations, the AP 404 can also be added to entries 108 that correspond to the reference points 402 on the first and third floors.

In some implementations, the harvest data 406 may also include sensor measurements obtained from a barometer for determining a pressure (e.g., which can be used to determine an altitude) of the mobile device 112. The altitude measurement can be used to determine which floor of a venue the mobile device 112 is located on. In some implementations, the barometer measurements corresponding to each element of harvest data 406 can be analyzed to determine altitude changes of the mobile device 112 over the course of the trace. From the barometer measurements, a determination can be made as to which floors of the venue the mobile device 112 traveled to and from over the course of the trace. In some implementations, one or more portions of the trace can be filtered based on the barometer measurements. For example, if there is a conflict in a portion of the trace as to which floor the portion of the trace corresponds to (e.g., the positioning phase 120 indicates that the mobile device 112 is on a first floor, but the barometer measurements indicate that the mobile device 112 is on a second floor), the portion of the trace may be filtered out to avoid potentially-faulty data from being included in the database.

Figure 7:
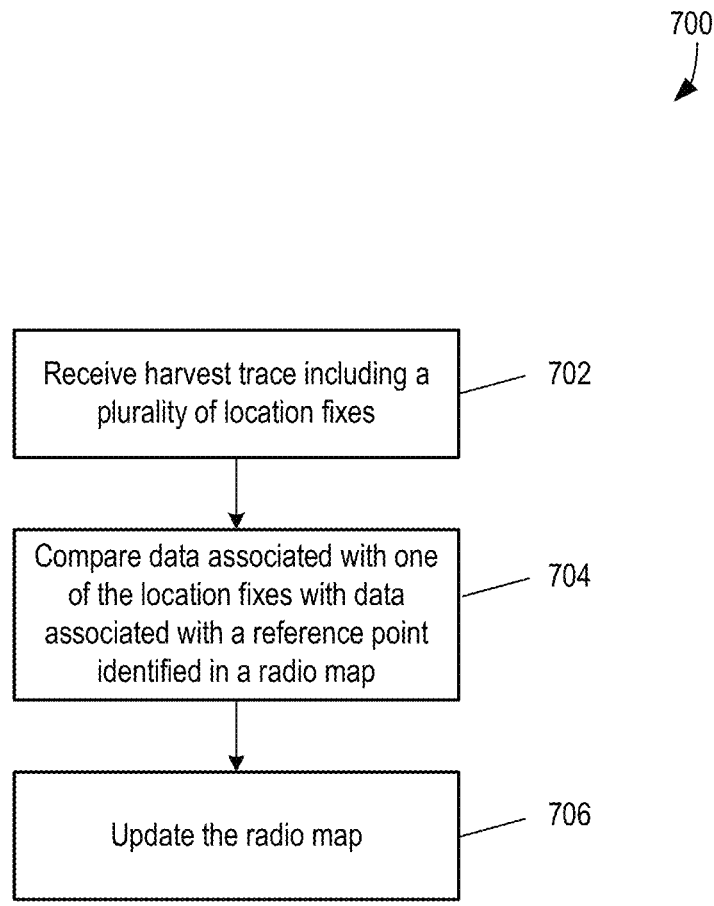
FIG. 7 is a flowchart of an exemplary process of updating a radio map.

FIG. 7 is a flowchart of an exemplary process 700 of updating a radio map (e.g., the radio map 400 of FIG. 4). The process 700 can be performed, for example, by the electronic device, such as the server, (e.g., a "cloud" server), described with respect to FIG. 8, or the computing device (e.g., a mobile computing device) described with respect to FIG. 9.

At step 702, a harvest trace (e.g., the trace 408 of FIG. 4) is received. The harvest trace is received from a mobile device (e.g., the mobile device 112 of FIG. 1). The harvest trace includes a plurality of location fixes each corresponding to a location at a venue. For example, referring to FIG. 4, the plurality of location fixes may be represented by the positions of the elements of harvest data 406. Each location fix is associated with data including one or more RSSI measurements of one or more wireless signals received from each of a plurality of wireless APs (e.g., the APs 404 of FIG. 4) positioned at the venue.

At step 704, data associated with one of the location fixes is compared with data (e.g., the entries 108 stored in the database 106) associated with a reference point (e.g., the reference points 402) identified in a radio map (e.g., the radio map 400) of the venue. For example, the data can be compared to determine whether any of the APs are present in the data associated with the location fix but absent in the data associated with the reference point, or absent in the data associated with the location fix but present in the data associated with the reference point.

At step 706, the radio map of the venue is updated by updating the data associated with the reference point based on the data associated with the one of the location fixes. For example, depending on the presence or absence of one or more of the APs, the data associated with the reference point can be updated (e.g., such that an entry that corresponds to an absent AP is removed and/or an entry that corresponds to a present AP is added). In this way, the AP is added or removed from the data. When an AP is removed from the data, the underlying data (e.g., RSSI measurements) associated with the removed AP may be preserved elsewhere in the database. For example, the RSSI measurements associated with an AP that is removed from an entry associated with one reference point may be preserved elsewhere because the RSSI measurements associated with the AP may be useful for other purposes.

In some implementations, when a determination is made to add or remove an entry that corresponds to an AP at a reference point on a particular floor of the venue, one or more additional reference points that correspond to the reference point may also be considered for adding and/or removing an entry that corresponds to the AP. For example, the one or more additional reference points that correspond to the reference point may be located above or below the reference point on a different floor of the venue. If an entry corresponding to the reference point is added or removed, another entry that corresponds to the one or more additional reference points can be similarly added or removed. In this way, floor selection bias (e.g., during a subsequent positioning phase 120 of FIG. 1) may be minimized or eliminated.

In some implementations, the data associated with the location fix and the data associated with the reference point are fit to a Rayleigh probability density function. For each wireless AP included in both sets of data, the Rayleigh probability density functions are compared, and the data associated with the reference point is updated based on the comparison. For example, if one of the APs has moved, or if structural features of the venue have changed between the data training phase and the positioning phase, the data associated with the location fix may represent the new location fingerprint of the reference point. As such, the data associated with the reference point may be updated to reflect the new location fingerprint for that reference point. In some implementations, based on the comparison, the data associated with the location fix may be filtered out. For example, if the Rayleigh probability density function associated with the location fix does not sufficiently match the Rayleigh probability density function for the reference point, the data associated with the location fix may be filtered out.

In some implementations, the process 700 also includes receiving a plurality of harvest traces, and filtering the harvest traces. In some implementations, a speed is determined for each of the plurality of harvest traces, and at least portions of the harvest trace that have a speed that satisfies a threshold are removed. In this way, data that does not appear to correspond to a walking speed of a human can be filtered out. In some implementations, the threshold may be five meters per second, although the threshold can be tunable. In some implementations, at least portion of the harvest traces that have a horizontal accuracy that satisfies a threshold are removed. In some implementations, the threshold may be between ten meters and 50 meters, although the threshold can be tunable and may be greater than or less than this range. In some implementations, the threshold is less than ten meters (e.g., two meters or less).

While the venue has largely been described as being a mall, other venues may be surveyed by the survey device to create a radio map. The venue may be an indoor venue (e.g., a restaurant, a shopping complex, a convention center, an indoor sports or concert stadium, a movie theater, a parking lot, a museum, an airport, etc.) or an outdoor venue (e.g., a street, an outdoor sports or concert stadium, an amusement park, a fair, a carnival, a park, a national park, a canyon, a valley, a collection of hiking trails, a parking garage, etc.). In some implementations, the venue may be aboveground or belowground (e.g., a belowground parking garage or a belowground shopping complex). In some implementations, the venue is a location that is not able to receive sufficiently accurate GPS signals. Therefore, the venue may be an outdoor location that includes obstructions to GPS signals (e.g., a crowded city block, a canyon, etc.).

While the RSSI measurements (e.g., for each AP at each reference point, for each AP at each location fix, etc.) are largely described as being fit to a Rayleigh distribution, other probability distributions having different probability density functions can also or alternatively be used. For example, in some implementations, one or more of a Uniform (e.g., Continuous) probability distribution, a Gaussian probability distribution, and a Ricean probability distribution may be used, among others. In some implementations, one or more aspects of any combination of the Rayleigh, Uniform, Gaussian, and Ricean probability density functions may be included in the probability density function that is used.

While the radio map has been largely described as being obtained by taking RSSI measurements of Wi-Fi signals received from various APs, one or more other wireless protocols may be employed instead of or in addition to Wi-Fi. For example, in some implementations, the survey device may be configured to obtain RSSI measurements for Bluetooth signals received when the survey device is positioned at various reference points. The Bluetooth signals may be received from various Bluetooth transmitter located throughout and/or proximate to a venue. Such RSSI measurements of the Bluetooth signals may be used, either alone or in combination with the Wi-Fi data, to generate the location fingerprint of the venue.

While the survey data has largely been described as being obtained by a survey device that measures characteristics of Wi-Fi signals, other types of data may be used as "source data." In other words, survey data is one example of the type of source data that can be used to receive the radio map (e.g., receive an initial radio map before self-healing occurs). In general, the source data has a relatively high degree of accuracy and can be trusted as corresponding to the true location of the device. In the examples largely described above, the survey data has a relatively high degree of accuracy because the locations that correspond to each reference point are manually input by a human user. In some implementations, survey data may be "truth data" obtained from truth sources (e.g., sources that are known to provide location data having a relatively high degree of accuracy, such as user-input data). In this way, rather than the initial radio map being built based on survey data, the initial radio map may be built using other high quality data from other truth sources. In some implementations, the high quality data may be high quality GPS data (e.g., which may be determined based on the horizontal error associated with the GPS data).

While the radio map has been largely described as being obtained by a survey device that measures a plurality of RSSIs from various APs at various reference points (e.g., provided as surveyor-entered positions), the radio map may be obtained (e.g., received) in other ways. In some implementations, the radio map may be built from source data other than survey data. In some implementations, the radio map may be previously obtained according to the techniques described herein. For example, the radio map may be obtained from a database of radio maps that were previously built.

While the radio map has largely been described as being obtained for an indoor venue, a similar process can be applied to build a radio map for an outdoor location. For example, outdoor locations can sometimes rely on GPS data to accurately determine a position of a device. However, some outdoor locations may have characteristics that result in inaccurate position determination using GPS. For example, city streets may have surrounding buildings that impede/obscure line of site of GPS signals, thereby causing difficulty in determining position using GPS. In rural areas, natural barriers (e.g., canyons, valleys, etc.) may similarly impede GPS signals. In such locations, a data training phase 110 may be used to build a radio map. Or, for example, one or more other techniques may be used for building a radio map (e.g., using other truth data).

Similarly, in some implementations, indoor venues may not require a data training phase 110 to build a radio map. For example, an indoor location may have a glass roof or some other characteristic that allows GPS signals to sufficiently cover the venue. In such circumstances, GPS data may be identified as being of relatively high accuracy such that the GPS data can be accepted as truth data. In some implementations, such GPS data can be used to build the radio map. In general, outdoor locations may have characteristics similar to typical indoor locations, and indoor locations may have characteristics similar to typical outdoor locations, such that the technique described herein as largely applying to indoor locations can likewise be applied to outdoor locations, and vice versa.

In some implementations, the WLAN (e.g., Wi-Fi) infrastructure may follow an IEEE standard, such as an IEEE 802.11 protocol, although other protocols may also or alternatively be used.

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Example System Architecture

Figure 8:
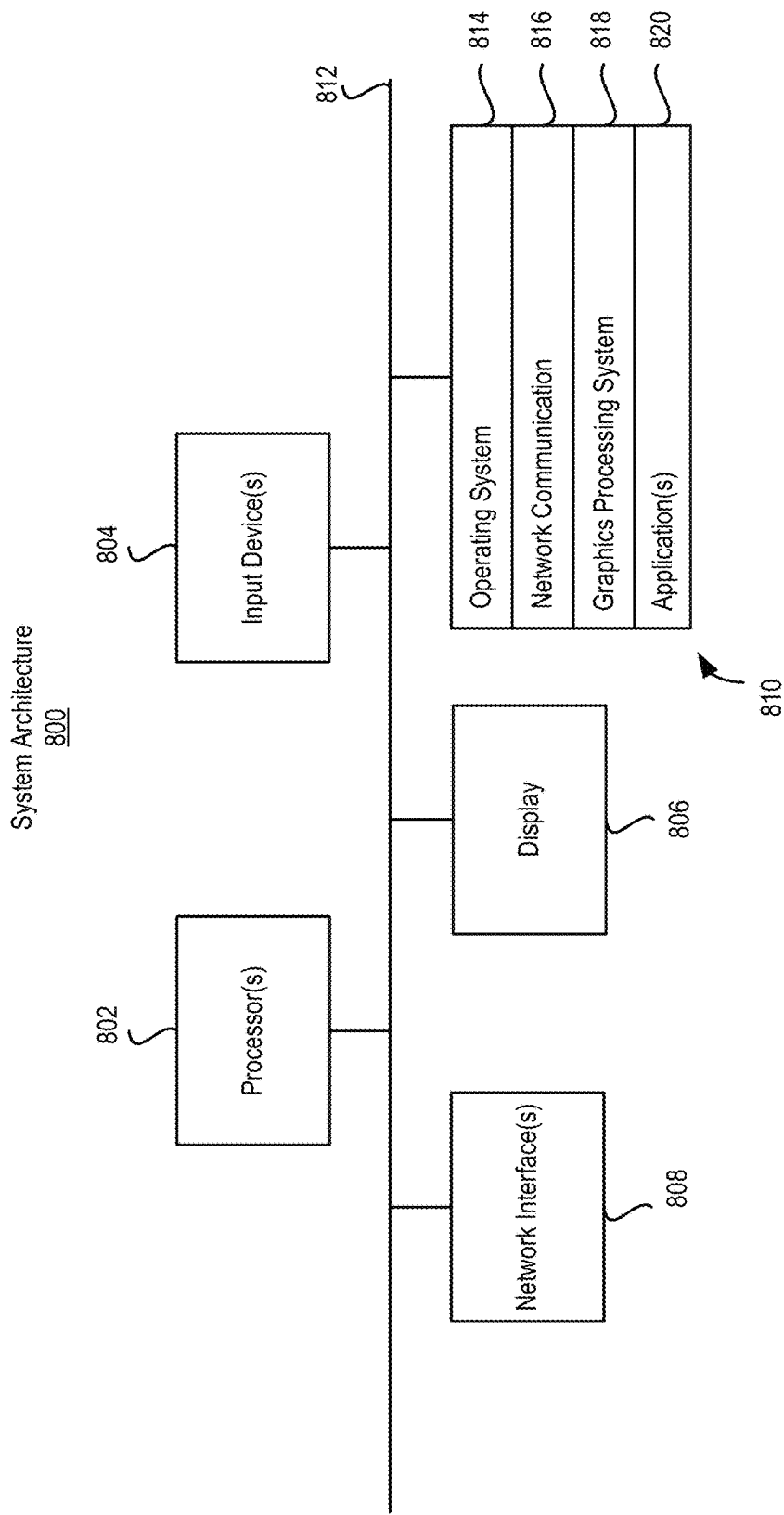
FIG. 8 is a block diagram of an exemplary system architecture of an electronic device implementing the features and operations described in reference to FIGS. 1-7.

FIG. 8 is a block diagram of an exemplary system architecture of an electronic device implementing the features and processes of FIGS. 1-7. The architecture 800 can be implemented on any electronic device that runs software applications derived from compiled instructions, including without limitation personal computers, servers, smart phones, media players, electronic tablets, game consoles, email devices, etc. In some implementations, the architecture 800 can include one or more processors 802, one or more input devices 804, one or more display devices 806, one or more network interfaces 808 and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but are not limited to graphics processors and multi-core processors.

Input device 804 can be any known input device technology, including but not limited to a keyboard (including a virtual keyboard), mouse, track ball, and touch-sensitive pad or display. In some implementations, the input device 804 could include a microphone that facilitates voice-enabled functions, such as speech-to-text, speaker recognition, voice replication, digital recording, and telephony functions. The input device 804 can be configured to facilitate processing voice commands, voiceprinting and voice authentication. In some implementations, audio recorded by the input device 804 is transmitted to an external resource for processing. For example, voice commands recorded by the input device 804 may be transmitted to a network resource such as a network server which performs voice recognition on the voice commands.

Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.).

Computer-readable medium 810 can include various instructions 814 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 can establish and maintain network connections (e.g., software for implementing communication protocols, such as TCP/IP, HTTP, Ethernet, etc.).

A graphics processing system 818 can include instructions that provide graphics and image processing capabilities. For example, the graphics processing system 818 can implement the processes described with reference to FIGS. 1-7.

Application(s) 820 can be an application that uses or implements the processes described in reference to FIGS. 1-7. The processes can also be implemented in operating system 814.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Example Mobile Device Architecture

Figure 9:
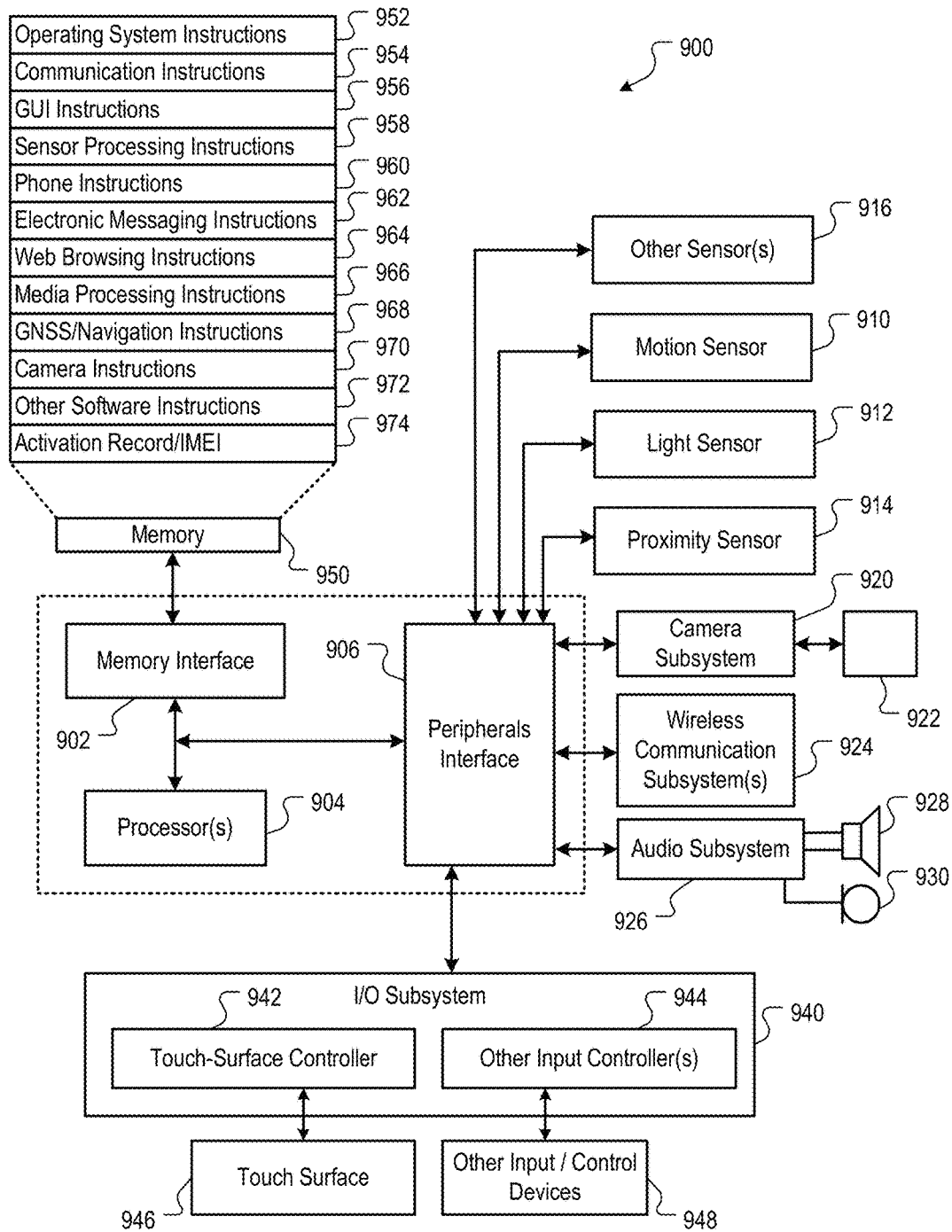
FIG. 9 is a block diagram of an exemplary device architecture of a computing device implementing the features and operations described in reference to FIGS. 1-7.

FIG. 9 is a block diagram of an exemplary device architecture of a computing device 900, such as a mobile device, that can implement the features and operations described in reference to FIGS. 1-7. For example, the survey device (102 of FIG. 1) and/or the mobile device (112 of FIG. 1) may be examples of the computing device 900. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 900 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication. In some implementations, the microphone 930 facilitates voice-enabled functions, such as speech-to-text, speaker recognition, voice replication, digital recording, and telephony functions. The audio subsystem 926 can be configured to facilitate processing voice commands, voiceprinting and voice authentication. In some implementations, audio recorded by the audio subsystem 926 is transmitted to an external resource for processing. For example, voice commands recorded by the audio subsystem 926 may be transmitted to a network resource such as a network server which performs voice recognition on the voice commands.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement security lockout and voice authentication features.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and functions; and/or camera instructions 970 to facilitate camera-related processes and functions.

The memory 950 can store other software instructions 972 to facilitate other processes and functions, such as security and/or authentication processes and functions. For example, the software instructions can include instructions for performing voice authentication on a per application or per feature basis and for allowing a user to configure authentication requirements of each application or feature available on a device.

The memory 950 can also store other software instructions (not shown), such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) 974 or similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
   receiving a harvest trace from a mobile device, the harvest trace including a plurality of location fixes each corresponding to a location of a venue, each location fix associated with data including RSSI measurements of wireless signals received from each of a first plurality of wireless access points positioned at the venue, the plurality of location fixes including at least two location fixes that have a positional relationship with each other;
   comparing the data associated with one of the location fixes with data associated with a reference point identified in a radio map of the venue, the data associated with the reference point includes RSSI measurements of wireless signals received from each of a second plurality of wireless access points;
   based upon the comparing, determining that one or more of the first plurality of wireless access points are absent from the second plurality of wireless access points;
   updating the data associated with the reference point to include the RSSI measurements of the wireless signals received from the one or more absent wireless access points;
   identifying an additional reference point located above or below the reference point on a different floor of the venue that correspond to the reference point;
   updating data associated with the additional reference point to include the RSSI measurements of the wireless signals received from the one or more absent wireless access points; and
   updating the radio map of the venue based on the updated data associated with the reference point.

2. The method of claim 1, wherein the RSSI measurements for each of the first plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

3. The method of claim 2, comprising:
   for each wireless access point included in both the data associated with the one of the location fixes and the data associated with the reference point, comparing the Rayleigh probability density function for the wireless access point associated with the one of the location fixes to the Rayleigh probability density function for the wireless access point associated with the reference point; and
   based on the comparison, updating the data associated with the reference point for the wireless access point to include at least some of the RSSI measurements of the wireless signals received from the wireless access point.

4. The method of claim 1, comprising:
   receiving a plurality of harvest traces from a plurality of mobile devices;
   filtering the plurality of harvest traces; and
   updating the data associated with the reference point based on the filtered plurality of harvest traces.

5. The method of claim 4, wherein, for each harvest trace, the RSSI measurements for each of the first plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

6. The method of claim 5, wherein filtering the plurality of harvest traces comprises, for each harvest trace:
   for each wireless access point included in both the data associated with the one of the location fixes and the data associated with the reference point, comparing the Rayleigh probability density function for the wireless access point associated with the one of the location fixes to the Rayleigh probability density function for the wireless access point associated with the reference point; and
   removing at least a portion of the harvest trace if a degree of similarity between the Rayleigh probability density function for the wireless access point associated with the one of the location fixes and the Rayleigh probability density function for the wireless access point associated with the reference point does not satisfy a threshold.

7. The method of claim 4, wherein filtering the plurality of harvest traces comprises:
   determining, for each of the plurality of harvest traces, a speed of the mobile device; and
   for each of the plurality of harvest traces, removing at least a portion of the harvest trace if the speed of the mobile device satisfies a threshold.

8. The method of claim 7, wherein the threshold is five meters per second.

9. The method of claim 4, wherein filtering the plurality of harvest traces comprises:
   determining, for each of the plurality of harvest traces, a horizontal accuracy of each of the plurality of location fixes of the harvest trace; and
   for each of the plurality of harvest traces, removing at least portions of the harvest trace that correspond to location fixes that have a horizontal accuracy that satisfies a threshold.

10. The method of claim 9, wherein the threshold is ten meters.

11. The method of claim 1, wherein the harvest trace represents a continuous motion path of the mobile device.

12. The method of claim 1, wherein the harvest trace comprises a plurality of elements of harvest data, each element of harvest data corresponding to one of the location fixes.

13. The method of claim 12, wherein each element of harvest data includes a plurality of sensor measurements.

14. The method of claim 13, wherein the plurality of sensor measurements for each element of harvest data are used to determine a speed and a heading rate of the mobile device for the corresponding element of harvest data.

15. The method of claim 14, wherein each of the location fixes is determined based at least in part on the speed and the heading rate for the corresponding element of harvest data.

16. A system comprising:
one or more processors; and
at least one non-transitory device storing computing instructions operable to cause the one or more processors to perform operations comprising:
receiving a harvest trace from a mobile device, the harvest trace including a plurality of location fixes each corresponding to a location of a venue, each location fix associated with data including RSSI measurements of wireless signals received from each of a first plurality of wireless access points positioned at the venue, the plurality of location fixes including at least two location fixes that have a positional relationship with each other;
comparing the data associated with one of the location fixes with data associated with a reference point identified in a radio map of the venue, the data associated with the reference point includes RSSI measurements of wireless signals received from each of a second plurality of wireless access points;
based upon the comparing, determining that one or more of the first plurality of wireless access points are absent from the second plurality of wireless access points;
updating the data associated with the reference point to include the RSSI measurements of the wireless signals received from the one or more absent wireless access points;
identifying an additional reference point located above or below the reference point on a different floor of the venue that correspond to the reference point;
updating data associated with the additional reference point to include the RSSI measurements of the wireless signals received from the one or more absent wireless access points; and
updating the radio map of the venue based on the updated data associated with the reference point.

17. The system of claim 16, wherein the RSSI measurements for each of the first plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

18. The system of claim 16, wherein the operations further comprise:
receiving a plurality of harvest traces from a plurality of mobile devices;
filtering the plurality of harvest traces; and
updating the data associated with the reference point based on the filtered plurality of harvest traces.

19. The system of claim 18, wherein filtering the plurality of harvest traces comprises:
determining, for each of the plurality of harvest traces, a speed of the mobile device; and
for each of the plurality of harvest traces, removing at least a portion of the harvest trace if the speed of the mobile device satisfies a threshold.

20. The system of claim 16, wherein the harvest trace comprises a plurality of elements of harvest data, each element of harvest data corresponding to one of the location fixes.

21. At least one non-transitory storage device storing computer instructions operable to cause one or more processors to perform operations comprising:
receiving a harvest trace from a mobile device, the harvest trace including a plurality of location fixes each corresponding to a location of a venue, each location fix associated with data including RSSI measurements of wireless signals received from each of a first plurality of wireless access points positioned at the venue, the plurality of location fixes including at least two location fixes that have a positional relationship with each other;
comparing the data associated with one of the location fixes with data associated with a reference point identified in a radio map of the venue, the data associated with the reference point includes RSSI measurements of wireless signals received from each of a second plurality of wireless access points;
based upon the comparing, determining that one or more of the first plurality of wireless access points are absent from the second plurality of wireless access points;
updating the data associated with the reference point to include the RSSI measurements of the wireless signals received from the one or more absent wireless access points;
identifying an additional reference point located above or below the reference point on a different floor of the venue that correspond to the reference point;
updating data associated with the additional reference point to include the RSSI measurements of the wireless signals received from the one or more absent wireless access points; and
updating the radio map of the venue based on the updated data associated with the reference point.

22. The at least one non-transitory storage device of claim 21, wherein the RSSI measurements for each of the first plurality of wireless access points associated with the one of the location fixes have an RSSI probability distribution that is fit to a Rayleigh probability density function, and the RSSI measurements for each of the second plurality of wireless access points associated with the reference point have an RSSI probability distribution that is fit to a Rayleigh probability density function.

23. The at least one non-transitory storage device of claim 21, wherein the operations further comprise:
receiving a plurality of harvest traces from a plurality of mobile devices;
filtering the plurality of harvest traces; and
updating the data associated with the reference point based on the filtered plurality of harvest traces.

24. The at least one non-transitory storage device of claim 23, wherein filtering the plurality of harvest traces comprises:
determining, for each of the plurality of harvest traces, a speed of the mobile device; and for each of the plurality of harvest traces, removing at least a portion of the harvest trace if the speed of the mobile device satisfies a threshold.

25. The at least one non-transitory storage device of claim 21, wherein the harvest trace comprises a plurality of elements of harvest data, each element of harvest data corresponding to one of the location fixes.

\* \* \* \* \*